(12) United States Patent
Rozbicki et al.

(10) Patent No.: US 10,884,311 B2
(45) Date of Patent: *Jan. 5, 2021

(54) OBSCURING BUS BARS IN ELECTROCHROMIC GLASS STRUCTURES

(71) Applicant: View, Inc., Milpitas, CA (US)

(72) Inventors: Robert T. Rozbicki, Los Gatos, CA (US); Gordon E. Jack, San Jose, CA (US); Disha Mehtani, Mountain View, CA (US); Robin Friedman, Sunnyvale, CA (US)

(73) Assignee: View, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/780,606

(22) PCT Filed: Dec. 20, 2016

(86) PCT No.: PCT/US2016/067813
§ 371 (c)(1),
(2) Date: May 31, 2018

(87) PCT Pub. No.: WO2017/112685
PCT Pub. Date: Jun. 29, 2017

(65) Prior Publication Data
US 2018/0364539 A1    Dec. 20, 2018

Related U.S. Application Data

(63) Continuation-in-part of application No. 15/038,727, filed as application No. PCT/US2014/072362 on Dec. 24, 2014, now Pat. No. 9,952,481.
(Continued)

(51) Int. Cl.
*G02F 1/153* (2006.01)
*G02F 1/157* (2006.01)
(Continued)

(52) U.S. Cl.
CPC ............ *G02F 1/157* (2013.01); *E06B 3/6722* (2013.01); *E06B 9/24* (2013.01); *G02F 1/0147* (2013.01);
(Continued)

(58) Field of Classification Search
CPC ...... G02F 1/157; G02F 1/0147; G02F 1/1345; G02F 1/155; G02F 1/161; E06B 3/6722; E06B 9/24; E06B 2009/2464; G02B 5/23
(Continued)

(56) References Cited

U.S. PATENT DOCUMENTS

| 5,302,414 A | 4/1994 | Alkhimov et al. |
| 6,118,573 A | 9/2000 | Kubo et al. |

(Continued)

FOREIGN PATENT DOCUMENTS

| CN | 202111111 U | 1/2012 |
| CN | 103261960 A | 8/2013 |

(Continued)

OTHER PUBLICATIONS

U.S. Preliminary Amendment dated Dec. 28, 2016 in U.S. Appl. No. 15/038,727.
(Continued)

*Primary Examiner* — William Choi
(74) *Attorney, Agent, or Firm* — Weaver Austin Villeneuve & Sampson LLP; Brian D. Griedel

(57) ABSTRACT

Embodiments described include bus bars for electrochromic or other optical state changing devices. The bus bars are configured to color match and/or provide minimal optical contrast with their surrounding environment in the optical device. Such bus bars may be transparent bus bars.

28 Claims, 19 Drawing Sheets

Related U.S. Application Data

(60) Provisional application No. 62/270,461, filed on Dec. 21, 2015, provisional application No. 61/920,684, filed on Dec. 24, 2013.

(51) Int. Cl.
  *G02F 1/1345* (2006.01)
  *G02F 1/01* (2006.01)
  *E06B 9/24* (2006.01)
  *G02F 1/155* (2006.01)
  *E06B 3/67* (2006.01)
  *G02F 1/161* (2006.01)
  *G02B 5/23* (2006.01)

(52) U.S. Cl.
  CPC ............ *G02F 1/1345* (2013.01); *G02F 1/155* (2013.01); *E06B 2009/2464* (2013.01); *G02B 5/23* (2013.01); *G02F 1/161* (2013.01)

(58) Field of Classification Search
  USPC .......................... 359/265, 267, 275; 345/105
  See application file for complete search history.

(56) References Cited

U.S. PATENT DOCUMENTS

| | | | |
|---|---|---|---|
| 6,471,360 B2 | 10/2002 | Rukavina et al. | |
| 6,924,919 B2 | 8/2005 | Hunia et al. | |
| 7,133,181 B2 | 11/2006 | Greer | |
| 7,586,664 B2 | 9/2009 | O'Shaughnessy et al. | |
| 7,649,668 B2 | 1/2010 | Fanton et al. | |
| 7,719,751 B2 | 5/2010 | Egerton et al. | |
| 8,164,818 B2 | 4/2012 | Collins et al. | |
| 8,213,074 B1 | 7/2012 | Shrivastava et al. | |
| 8,493,646 B2 | 7/2013 | Burdis | |
| 8,643,933 B2 | 2/2014 | Brown | |
| 8,711,465 B2 | 4/2014 | Bhatnagar et al. | |
| 9,081,247 B1 | 7/2015 | Pradhan et al. | |
| 9,128,346 B2 | 9/2015 | Shrivastava et al. | |
| 9,158,172 B2 | 10/2015 | Sbar et al. | |
| 9,158,173 B2 | 10/2015 | Bhatnagar et al. | |
| 9,442,339 B2 | 9/2016 | Parker et al. | |
| 9,454,053 B2 | 9/2016 | Strong et al. | |
| 9,482,922 B2 | 11/2016 | Brown et al. | |
| 9,952,481 B2 * | 4/2018 | Rozbicki | G02F 1/155 |
| 9,958,750 B2 | 5/2018 | Parker et al. | |
| 2002/0149829 A1 | 10/2002 | Mochizuka et al. | |
| 2007/0047058 A1 | 3/2007 | Lim | |
| 2007/0133078 A1 | 6/2007 | Fanton et al. | |
| 2008/0141936 A1 | 6/2008 | Pui et al. | |
| 2008/0315270 A1 | 12/2008 | Marsh et al. | |
| 2010/0067090 A1 | 3/2010 | Egerton et al. | |
| 2010/0200549 A1 | 8/2010 | Blankenship et al. | |
| 2010/0245044 A1 | 9/2010 | Dietemann | |
| 2011/0075244 A1 | 3/2011 | Millett et al. | |
| 2011/0255141 A1 | 10/2011 | Agrawal et al. | |
| 2012/0147449 A1 | 6/2012 | Bhatnagar et al. | |
| 2012/0300280 A1 | 11/2012 | Murphy et al. | |
| 2012/0327499 A1 | 12/2012 | Parker et al. | |
| 2013/0258436 A1 | 10/2013 | Podbelski et al. | |
| 2013/0278988 A1 | 10/2013 | Jack et al. | |
| 2014/0133005 A1 | 5/2014 | Sbar et al. | |
| 2014/0192393 A1 | 7/2014 | Bhatnagar et al. | |
| 2014/0239276 A1 * | 8/2014 | Lin | H01L 51/5246 257/40 |
| 2015/0098169 A1 | 4/2015 | Karlen et al. | |
| 2016/0377948 A1 | 12/2016 | Rozbicki et al. | |
| 2018/0210307 A1 | 7/2018 | Parker et al. | |
| 2018/0231859 A1 | 8/2018 | Rozbicki et al. | |
| 2019/0079365 A1 | 3/2019 | Sarrach et al. | |
| 2019/0094643 A1 | 3/2019 | Friedman et al. | |
| 2020/0110321 A1 | 4/2020 | Heintzelman | |

FOREIGN PATENT DOCUMENTS

| | | |
|---|---|---|
| CN | 103562788 A | 2/2014 |
| CN | 103643871 A | 3/2014 |
| CN | 104859408 A | 8/2015 |
| CN | 104950473 A | 9/2015 |
| WO | WO1996/024882 A1 | 8/1996 |
| WO | WO2009/020804 A1 | 2/2009 |
| WO | WO2013/138535 A1 | 9/2013 |
| WO | WO2013/163107 | 10/2013 |
| WO | WO2015/089663 A1 | 6/2015 |
| WO | WO2015/100419 A1 | 7/2015 |
| WO | WO2015/100419 A1 | 7/2015 |
| WO | WO2017/0112685 | 1/2017 |
| WO | 2017/112685 | 6/2017 |
| WO | WO2020/112907 | 6/2020 |

OTHER PUBLICATIONS

U.S. Notice of Allowance dated Aug. 25, 2017 in U.S. Appl. No. 15/038,727.
U.S. Notice of Allowance dated Dec. 18, 2017 in U.S. Appl. No. 15/038,727.
International Search Report and Written Opinion dated Apr. 1, 2015 from PCT/US2014/072362.
International Preliminary Report on Patentability dated Jul. 7, 2016 from PCT/US2014/072362.
CN Office Action dated May 19, 2017 in CN Application No. 201480067950.4.
CN Office Action dated Apr. 4, 2018 in CN Application No. 201480067950.4.
CN Office Action dated Oct. 15, 2018 in CN Application No. 201480067950.4.
EP Extended Search Report dated Aug. 17, 2017 in EP Application No. 14873490.8.
EP Office Action dated Mar. 29, 2019 in EP Application No. 14873490.8.
International Search Report and Written Opinion dated Apr. 10, 2017 from PCT/US2016/067813.
International Preliminary Report on Patentability dated Jun. 26, 2018 in PCT/US2016/067813.
International Search Report and Written Opinion (ISA/KR) dated May 24, 2017 from PCT/US2017/021408.
International Preliminary Report on Patentability dated Sep. 20, 2018 from PCT/US2017/021408.
Tseng, C-Y et al., "Improved performance mechanism of III-V compound triple-junction solar cell using hybrid electrode structure," Solar Energy, vol. 89, Jan. 19, 2013, pp. 17-22.
U.S. Office Action dated Nov. 4, 2019 in U.S. Appl. No. 15/924,099.
U.S. Final Office Action dated Apr. 20, 2020 in U.S. Appl. No. 15/924,099.
EP Extended Search Report dated May 29, 2019 in EP Application No. 16879981.5.
EP Office Action dated Jun. 12, 2020 in EP Application No. 16879981.5.
Invitation to Pay Additional Fees dated Mar. 11, 2020 in PCT Application No. PCT/US2019/063453.
International Search Report and Written Opinion dated Jul. 5, 2020 in PCT Application No. PCT/US2019/063453.
U.S. Notice of Allowance dated Oct. 8, 2020 in U.S. Appl. No. 15/924,099.
International Search Report and Written Opinion dated May 7, 2020 in PCT Application No. PCT/US2019/063453.

* cited by examiner

OBSCURING BUS BARS IN ELECTROCHROMIC GLASS STRUCTURES

CROSS-REFERENCES TO RELATED APPLICATIONS

This is a national stage application under 35 U.S.C § 371 to International Application PCT/US16/67813 (designating the United States), filed on Dec. 20, 2016 and titled "OBSCURING BUS BARS IN ELECTROCHROMIC GLASS STRUCTURES," which claims benefit of and priority to U.S. Provisional Patent Application 62/270,461, titled "OBSCURING BUS BARS IN ELECTROCHROMIC GLASS STRUCTURES" and filed on Dec. 21, 2015; International Application PCT/US16/67813 is a continuation-in-part of U.S. patent application Ser. No. 15/038,727 (now U.S. Pat. No. 9,952,481), titled "OBSCURING BUS BARS IN ELECTROCHROMIC GLASS STRUCTURES," and filed on May 23, 2016, which is a national stage application under 35 U.S.C. § 371 to International Application PCT/US14/72362 (designating the United States), filed on Dec. 24, 2014 and titled "OBSCURING BUS BARS IN ELECTROCHROMIC GLASS STRUCTURES," which claims benefit of and priority to U.S. Provisional Patent Application No. 61/920,684, titled "OBSCURING BUS BARS IN ELECTROCHROMIC GLASS STRUCTURES" and filed on Dec. 24, 2013; all of these applications are hereby incorporated by reference in their entirety and for all purposes.

FIELD

Certain embodiments disclosed herein relate generally to techniques for obscuring from view bus bars and other features within an electrochromic (EC) glass structure assembly having, for example, one or more insulated glass units (IGUs).

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

BRIEF SUMMARY

Certain embodiments described herein generally relate to techniques for obscuring bus bars in electrochromic glass structures.

Certain aspects are directed to an electrochromic glass structure comprising a substantially transparent substrate and an electrochromic device coating disposed on the substantially transparent substrate. The electrochromic device coating has one or more transparent conductive layers. The electrochromic glass structure further comprises a bus bar configured to power the electrochromic device and a strip of obscuration material aligned substantially parallel to the length of the bus bar. The strip of obscuration material is located on a surface of the electrochromic glass structure between the bus bar and an exterior environment to the electrochromic glass structure. In some cases, the strip of obscuration material has at least a width configured to block view of the bus bar from an observer viewing through the substantially transparent substrate. In one example, wherein the strip of obscuration material has a width greater than the width of the bus bar. In some cases, the strip of obscuration material is on an outer surface of the substantially transparent substrate. In one example, the strip of obscuration material is a thin flexible material (e.g., anodized aluminum) adhered to the outer surface of the substantially transparent substrate with an adhesive. In some cases, wherein the strip of obscuration material is located between the substantially transparent substrate's outer surface and another substantially transparent substrate's surface that is laminated to the substantially transparent substrate's outer surface.

In some cases, the strip of obscuration material is a thermochromic coating and/or photochromic coating. In some cases, the strip of obscuration material has an open cell pattern or is configured as a discontinuous pattern of shapes rather than a continuous strip of material. In some cases, the strip of obscuration material is opaque.

Certain aspects are directed to an insulated glass unit comprising first and second substantially transparent substrates, a spacer between the first and second substantially transparent substrate, a primary seal between the spacer and the first substantially transparent substrate and between the spacer and the second substantially transparent substrate, an electrochromic device on at least one of the first and second substantially transparent substrates, and a bus bar associated with the electrochromic device and located under the spacer and in the primary seal. The bus bar is configured to be camouflaged to blend in with its background. In some cases, the bus bar is configured to have minimal optical contrast with the primary seal and/or spacer of the IGU. In one case, the bus bar is made of an electrically conductive material comprising a tinting agent configured to approximate the color of the background to the primary seal and/or space of the IGU. The tint agent may comprise, for example, carbon black, graphite and/or graphene. In some cases, the bus bar comprises a thermochromic material and/or a photochromic material. In some cases, the bus bar comprises a thermochromic material. In some cases, the bus bar comprises a photochromic material.

Certain embodiments pertain to an insulated glass unit (IGU) comprising first and second substantially transparent substrates, a spacer between the first and second substantially transparent substrates, a primary seal, an electrochromic device, and a bus bar associated with the electrochromic device. The primary seal is between the spacer and the first substantially transparent substrate and between the spacer and the second substantially transparent substrate. The electrochromic device is on at least one of the first and second substantially transparent substrates. The bus bar is associated with the electrochromic device and located at least partially in the primary seal, the bus bar camouflaged to blend in with its background. In some cases, camouflaged can mean having minimal optical contrast between the bus bar and the primary seal and/or spacer. In one case, the bus bar is made of an electrically conductive material comprising a tinting agent configured to approximate the color and luminescence of the bus bar to its background.

Certain embodiments pertain to an electrochromic glass structure comprising a substantially transparent substrate, an electrochromic device disposed on the substantially transparent substrate. The electrochromic device has one or more transparent conductive layers. The electrochromic glass structure further comprises a bus bar configured to power the electrochromic device and an opaque obscuring layer between the one or more transparent conductive layers and the substantially transparent substrate in a region proximal the bus bar. In some cases, the opaque obscuring layer is located in a region between the bus bar and the substantially transparent substrate. In some cases, the opaque obscuring layer has at least a width configured to block view of the bus bar from an observer outside the electrochromic glass structure. In some cases, the bus bar is made of a material with a color and luminescence configured to blend in with background. In one case, the bus bar material comprises one or more of carbon black, graphite, graphite-based materials, graphene, or graphene-based materials.

Certain embodiments pertain to an IGU comprising a first pane having a first substantially transparent substrate, an electrochromic device disposed on the second substantially transparent substrate, the electrochromic device comprising a first transparent conductive layer proximal the second substantially transparent substrate, an electrochromic stack, and a second transparent conductive layer. The IGU further comprises a second pane having a second substantially transparent substrate, a spacer between the first and second panes, a primary sealant adhering the spacer to the first and second panes, and a pair of bus bars on the first transparent conductive layer, nearest the first pane, and one or more transparent bus bars on the second transparent conductive layer. The pair of bus bars is located between the spacer and the first substantially transparent substrate such that the spacer blocks view of the pair of bus bars from an observer viewing through the second pane. In some cases, the pair of bus bars is made of materials configured to match color and luminescence to the spacer and/or the primary sealant. In some cases, the one or more transparent bus bars are in the viewable region of the IGU. In one case, the additional one or more transparent bus bars are patterned onto the first substantially transparent substrate and then the first transparent conductor layer is fabricated thereon. In one case, the additional one or more transparent bus bars are embedded in the first substantially transparent substrate in at least in the viewable region of the IGU.

Certain embodiments pertain to an IGU or laminate comprising an electrochromic device on at least one transparent substrate, of at least two transparent substrates of the IGU or laminate and at least one transparent bus bar configured to electrically power the electrochromic device. In some cases, the transparent bus bar comprises a transparent conductive material embedded with conductive particles. In some cases, the conductive particles are nanoparticles. In some cases, the at least one transparent bus bar is a thin layer of metal or metal alloy. In one example, the thin layer of metal or metal alloy is between about 1 nm and about 10 nm thick. In another example, the thin layer of metal or metal alloy is less than about 5 nm thick.

These and other features are described in more detail below with reference to the associated drawings.

DETAILED DESCRIPTION

Figure 1A:
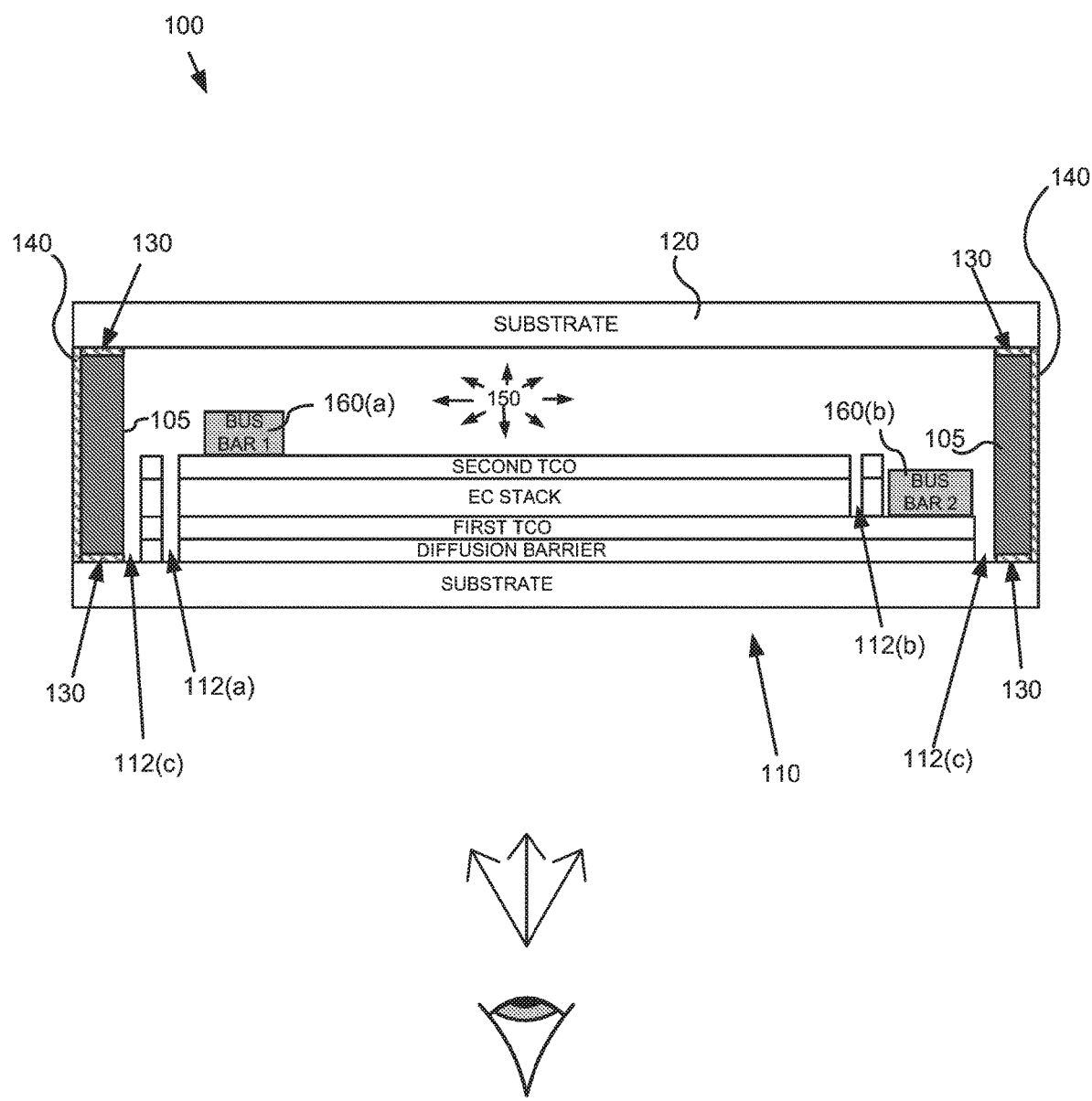
FIG. 1A is a schematic drawing of a cross section of an insulated glass unit (IGU) of an electrochromic window assembly.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

An electrochromic (EC) glass structure can refer to a structure including one or more EC panes (also referred to herein as EC lites) such as, for example, an insulated glass unit (IGU) or an EC pane laminated to another pane, EC or not. An example of an EC glass structure assembly is an EC window assembly having one or more IGUs. Each IGU is manufactured from two or more panes where at least one of the panes is an EC pane. Each of the EC pane and/or mate lite of an IGU may be alone or laminated to another pane for strength. The EC pane comprises a substantially transparent substrate (e.g., glass substrate) and an EC device fabricated on the substrate. Methods of fabricating EC panes, laminates and IGUs can be found in U.S. patent application Ser. No. 13/456,056 titled "ELECTROCHROMIC WINDOW FABRICATION METHODS," filed on Apr. 25, 2012, which is hereby incorporated by reference in its entirety. In these fabrication methods, EC panes with fully assembled EC devices are fabricated first, and then IGUs are manufactured using one or more of the EC panes. Typically, an IGU is formed by placing a sealing separator, for example, a gasket or seal (for example made of PVB (polyvinyl butyral), PIB or other suitable elastomer) around the perimeter of the substrate. In some embodiments, the sealing separator includes a metal, or other rigid material, spacer and sealant between the spacer and each substrate. After the panes are sealed to the spacer, a secondary seal is provided around the outer perimeter of the spacer, for example a polymeric material, e.g. a silicone-based material that resists water and that adds structural support to the assembly. In some cases, a desiccant may be included in the IGU frame or spacer during assembly to absorb any moisture. In one case, the sealing separator surrounds the bus bars and electrical leads to the bus bars extend through the seal. Typically, but not necessarily, the IGU is filled with inert gas such as argon. The completed IGU can be installed in, for example, a frame or wall and connected to a power source (or wirelessly powered) and a controller to control power to transition the optical states of the EC device(s). Examples of bus bars and spacers can be found in U.S. patent application Ser. No. 13/312,057 titled "SPACERS FOR INSULATED GLASS UNITS" and filed on Dec. 6, 2011 and U.S. patent application Ser. No. 13/452,032 titled "ANGLED BUS BAR" and filed on Apr. 20, 2012, which are hereby incorporated by reference in their entirety.

In a conventional EC glass structure assembly, especially on larger size substrates, manufacturers use a bus bar and/or scribe lines in the viewable area of the IGU, e.g. due to engineering or perceived need to do so. This has traditionally been aesthetically unpleasing due to the contrast between the EC device and the scribe line and/or bus bar in the viewable area.

For example, referring to FIG. 1A, which shows a conventional electrochromic IGU, 100, and an observer viewing the IGU (as depicted with the stylized eye) that might be able to see both bus bars and other features when the EC coating is darkened or in the clear state. FIG. 1A is a schematic drawing of a cross section of an IGU 100 of an EC IGU 100. In FIG. 1A, a spacer, 105, is used to separate a first EC pane 110 from a second pane 220. The first EC pane includes an EC device fabricated on a substantially transparent substrate such as a glass substrate. The second pane 220 in this example is a non-EC pane. In other examples, second pane 220 can have an EC device thereon and/or one or more coatings such as low-E coatings and the like. Between spacer 105 and, in this example, the substrate of first EC pane 110 is a primary seal, 130. This primary seal 130 is also between spacer 105 and the second non-EC pane 220. Around the perimeter of spacer 105 is a secondary seal, 140 (bus bar wiring may traverse the primary seal for connection to controller). These seals aid in keeping moisture out of the interior space, 150, of IGU 100.

In FIG. 1A, areas 112(a) and 112(b) represent where the EC device stack has been removed (e.g., by laser scribing), in this example, at a perimeter region. In this example, the area 112(a) passes through the second transparent conducting oxide (TCO), the EC stack and the first TCO, and may be able to isolate the operable EC device from other portions of the EC device that were potentially damaged during edge deletion. In certain cases, the EC stack comprises an EC layer, a counter electrode (CE) layer, and an optional discrete ion conducting (IC) layer. Area 112(b) also passes through the second TCO and the device stack, but not the bottom first TCO, as this serves as the lower conductor in electrical communication with bus bar 2. Regardless, areas 112(a) and 112(b) allow light to pass through the glass, even though the EC device layers may be darkened. In this example, the EC stack, the first TCO and the diffusion barrier were removed in the edge deletion areas, and the outer perimeter of the EC device does not pass under the spacer into the primary seal, thus areas 112(c) will also allow light to pass through even when the EC device is darkened, because they have no EC coating.

Figure 1B:
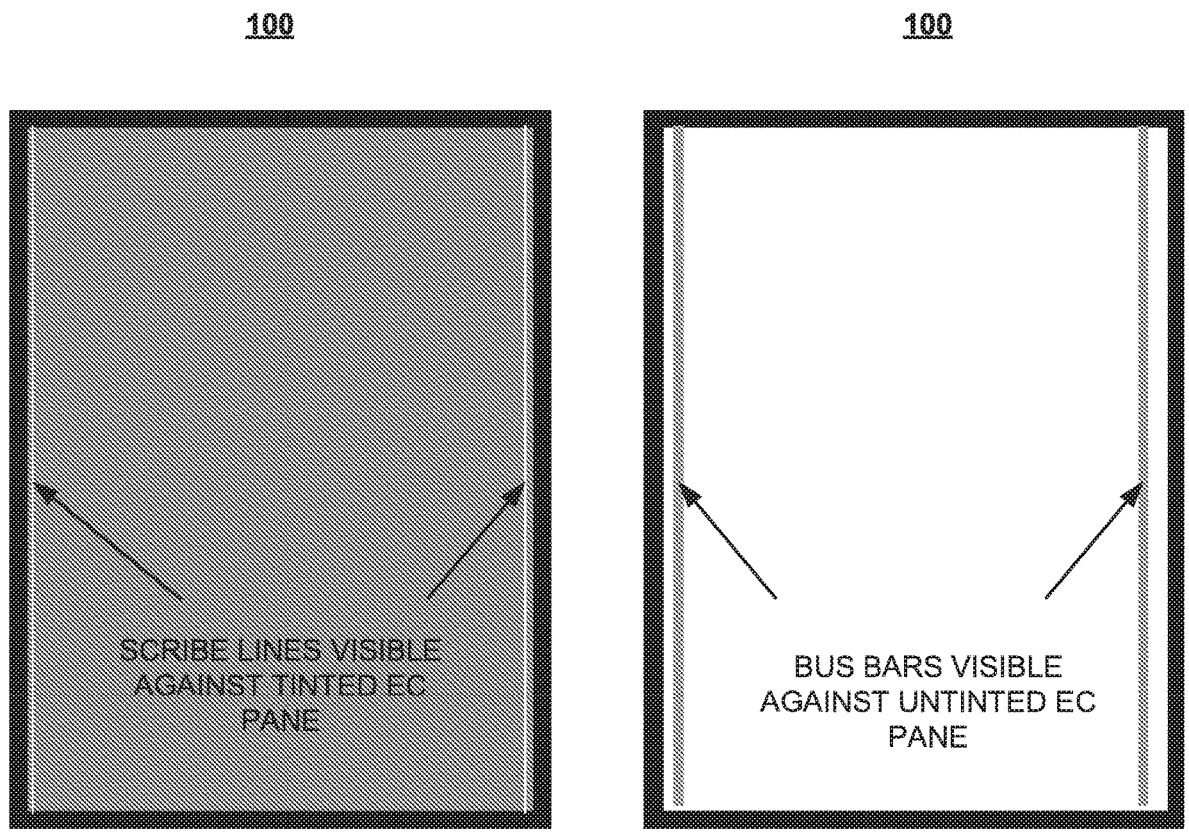
FIG. 1B is a schematic drawing of plan views of the IGU in an un-tinted state (left hand side illustration) and a tinted state (right hand side illustration) from the perspective of the observer shown by the illustrated eye in FIG. 1A.

In FIG. 1A, bus bar 1 160(a) is fabricated on the second TCO of the EC stack and bus bar 2 160(b) is fabricated on the first TCO. The illustrated eye shows the perspective of an observer viewing the IGU 100 from the outside. FIG. 1B shows plan views of IGU 100 in an un-tinted state (left hand side illustration) and a tinted state (right hand side illustration) from the perspective of the observer shown by the illustrated eye in FIG. 1A. As shown, unless the techniques for obscuring of certain embodiments are used, the bus bars and/or the scribe lines in IGU 100 are visible in contrast with its background of the EC device (tinted and untinted) and/or the surrounding spacer. In the tinted state, the scribe lines are visible against the first EC pane 110 in the tinted state. Although not shown, the bus bar bus bar 1 160(a) and bus bar 2 160(b) may also be partially visible in the tinted state. In the untinted state, bus bar bus bar 1 160(a) and bus bar 2 160(b) are visible. The issues related to visibility of bus bars and scribe lines in relation to conventional IGUs are addressed by embodiments described herein, but also, even with improved IGUs, where no bus bars or scribe lines are in the viewable area, there may be issues related to the type of glazing into which IGUs are incorporated.

Figure 2A:
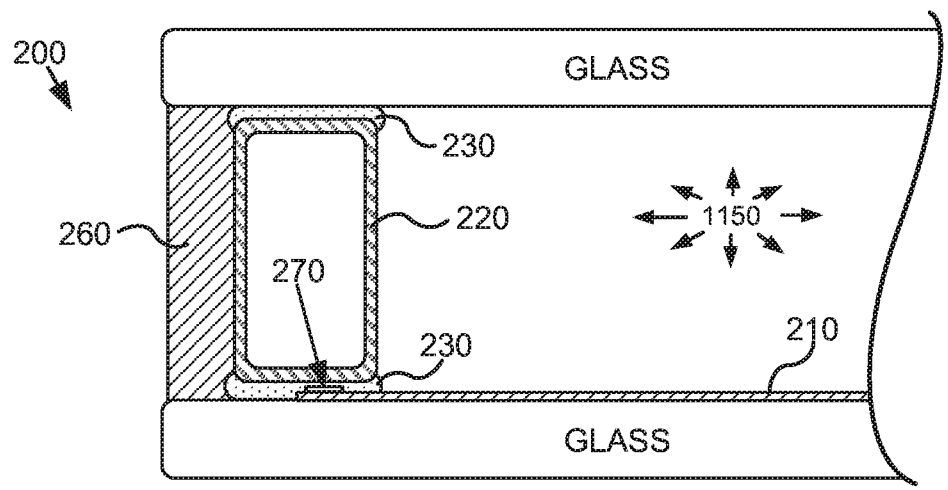
FIGS. 2A and 2B depict an electrochromic IGU configuration, according to embodiments.

Improved IGUs, for example, as described in U.S. patent application Ser. No. 13/456,056, are configured with bus bars that are under the spacer and in the primary seal of the IGU. The primary seal is the seal that is formed between the spacer surface and the glass surface when a sealant (sometimes referred to as a primary sealant) is used to join the two mating surfaces. One example of such a sealant is polyisobutylene (sometimes referred to as "PIB"). The PIB may or may not span the entire width of the spacer face that is joined to the glass surface, thus reference to a bus bar "in the primary seal" does not necessarily mean that the sealant completely covers the bus bar, it may be the case that some of the sealant or all (e.g. as illustrated in FIG. 2A) of the sealant span the width of the bus bar and/or the spacer. Generally speaking, then, reference to a bus bar "in the primary seal" refers to a bus bar that is between the spacer and the glass surfaces that mate to form the primary seal. A bus bar that is "between" the spacer and the glass surface means that all or substantially all of the length of the bus bar runs parallel to the spacer and is in between the spacer and the glass. In other embodiments, IGUs may have the bus bars in the secondary seal area or in the viewable area (the area within the inner perimeter of the spacer, i.e. the area the end user looks through of the window).

Figure 2B:
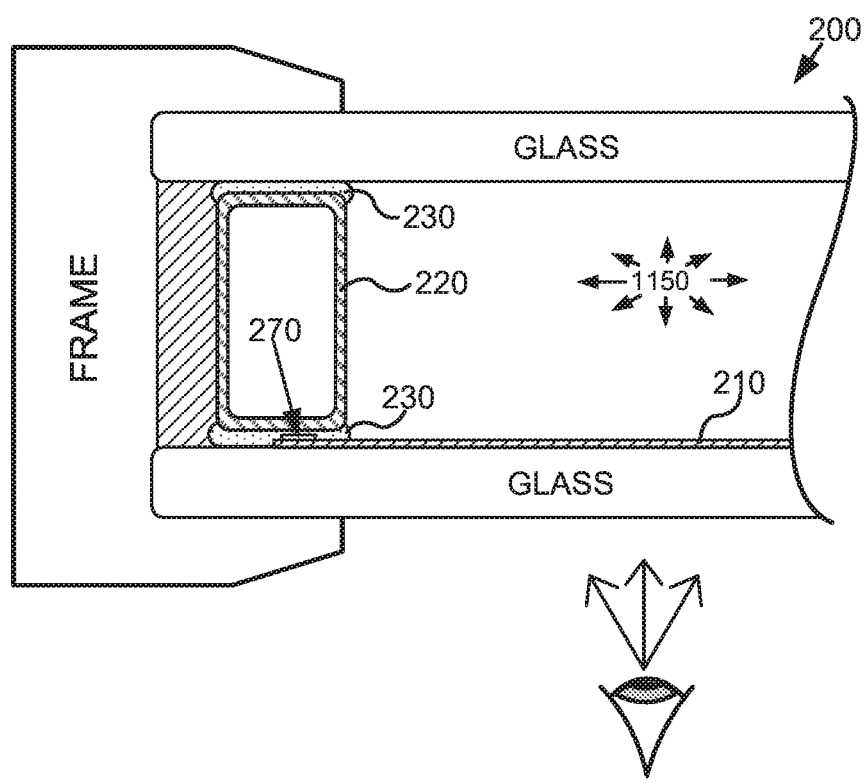

In FIG. 2A, a partial cross-section of an EC IGU 200, bus bar 270 is under the spacer 220 and embedded in the primary seal 230 of the IGU 200; that is, the bus bar is sandwiched between the substantially transparent substrate and the spacer 220. Though there may be insulating primary sealant between the bus bar and the spacer, in order to avoid electrical shorting between the bus bar and spacer, an electrically insulated spacer, e.g. polymeric (e.g. foam) or metal coated with an insulating material (e.g. color matched to the sealant, e.g. gray or black insulating material), is used. In the illustrated example, bus bar 270 is lying on the EC device 210 disposed on a substrate. Thus when such IGUs are installed in a frame, there are no bus bars visible to the end user, because they are not in the viewable area, see FIG. 2B; i.e. the frame blocks a line of sight to the bus bars. Still, if such IGUs are glazed using a butt joint or a structural sealant joint (e.g., an SSG joint) without flashing or other material covering the periphery of the IGU as a frame would otherwise do, an observer viewing the assembly from the outside will see bus bar 270 or other uncoated regions within the assembly through the glass as in the primary seal 230 or secondary seal 260, since the EC coating is transparent. Since bus bars are typically fabricated from a metallic material such as silver ink, they usually have a metallic color such as silver or copper. These metallic-colored bus bars can be visible when seen in contrast with the rest of the assembly. It is undesirable from an aesthetic standpoint to be able to see these bus bars and other uncoated regions (e.g., scribe lines) within the assembly.

Figure 3A:
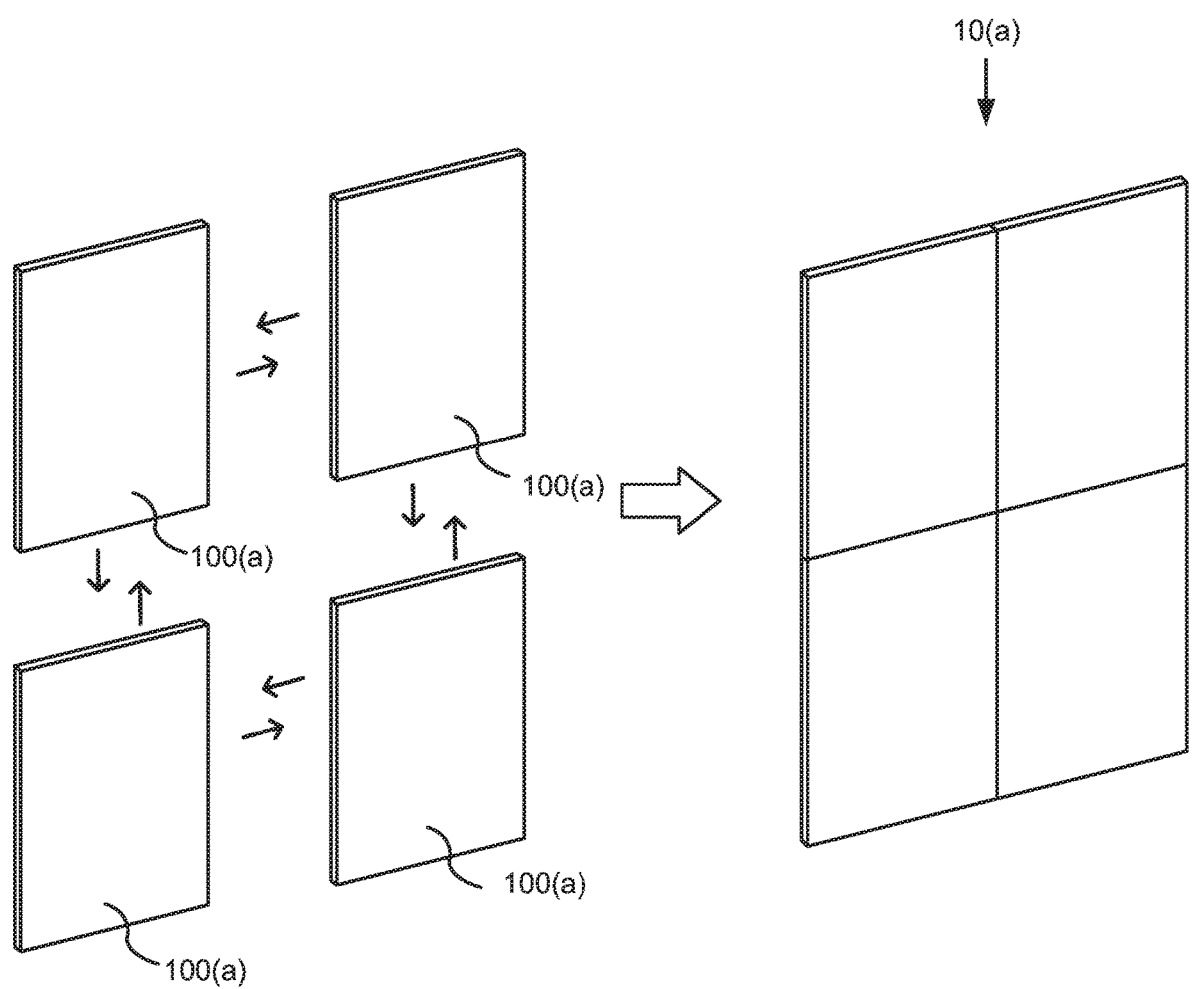
FIG. 3A is a schematic illustration of an electrochromic window assembly with butt joints between the four IGUs butted together, according to embodiments.
Figure 3B:
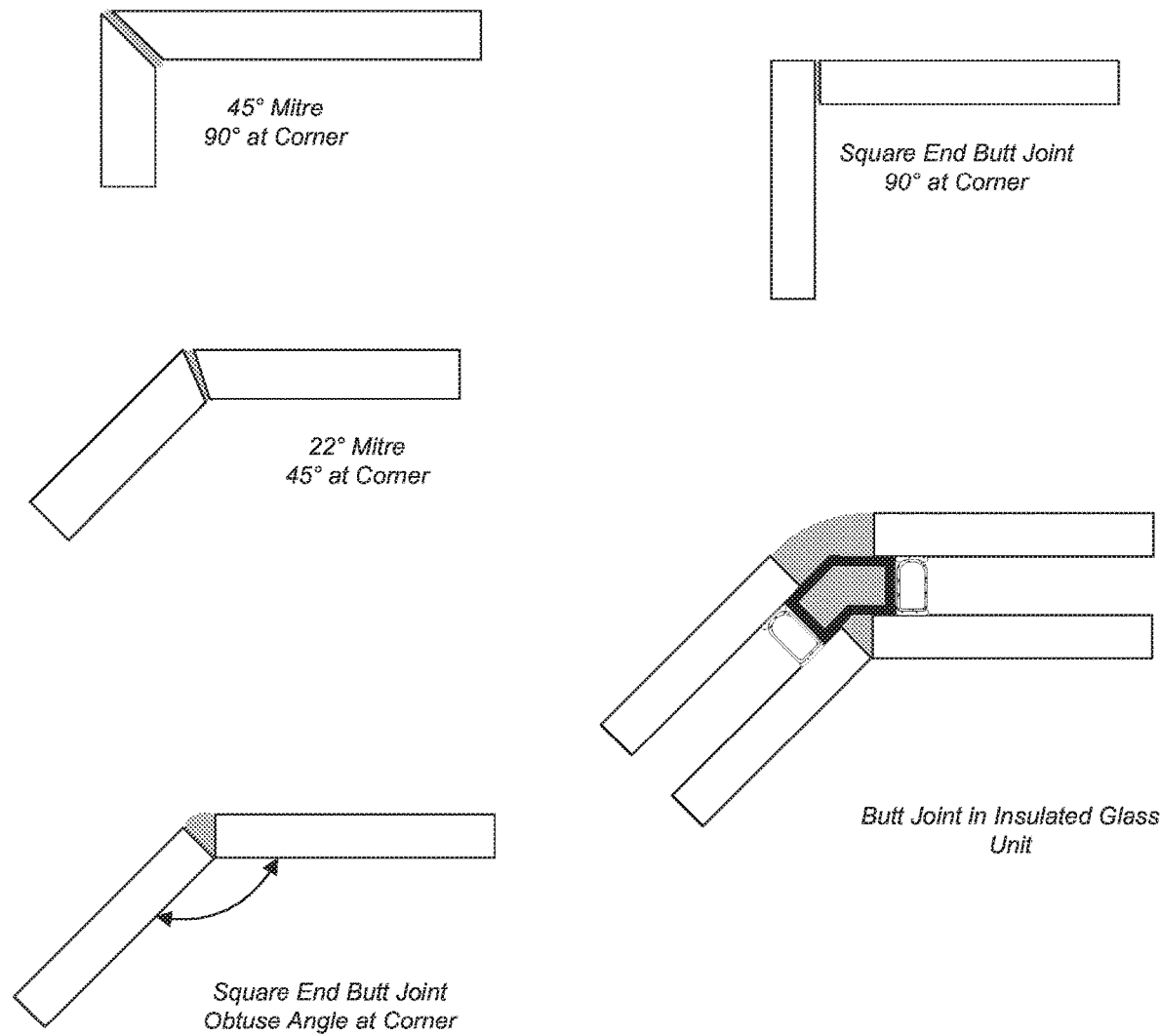
FIG. 3B are side views of different butt joint configurations, according to embodiments.

For example, an observer viewing a butt joint or a structural sealant joint between adjacent IGUs of an EC window assembly might be able to view conventional metallic bus bars within the assembly. FIG. 3A is a schematic drawing of an EC window assembly 10(a) having butt joints between four (4) IGUs 100(a) butted together. Butt joints are used in window structures to increase the visible area by combining EC glass structures (e.g., IGUs) with little or no extra framing added. Electrochromic window assemblies that have a butt joint generally have one or more structural member between the EC glass structures butted together that provide support at the joint. In the case of butted IGUs, for example, a structural member may provide support between the panes of the butted IGUs, at least partially in the secondary seal area of each IGU. In FIG. 3A, the EC window assembly 10(a) includes butt joints without framing (or flashing) exterior to the panes on either side. Although the illustrated embodiment shows adjacent IGUs butted together at a 180 angle, butt joints that provide a corner such as, for example, 45 degrees, 165 degrees, 90 degrees, etc. may also be used. In certain cases, mitering may also be used at a butt joint having a corner. FIG. 3B are side cross-sectional views of different possible butt joint configurations of embodiments. The illustrated butt joints may be silicone butt joints in one example. In these configurations, the bus bar is visible from the outside looking in (because the EC pane is typically mounted on the outer pane of an IGU), and this is an undesirable result.

Figure 3C:
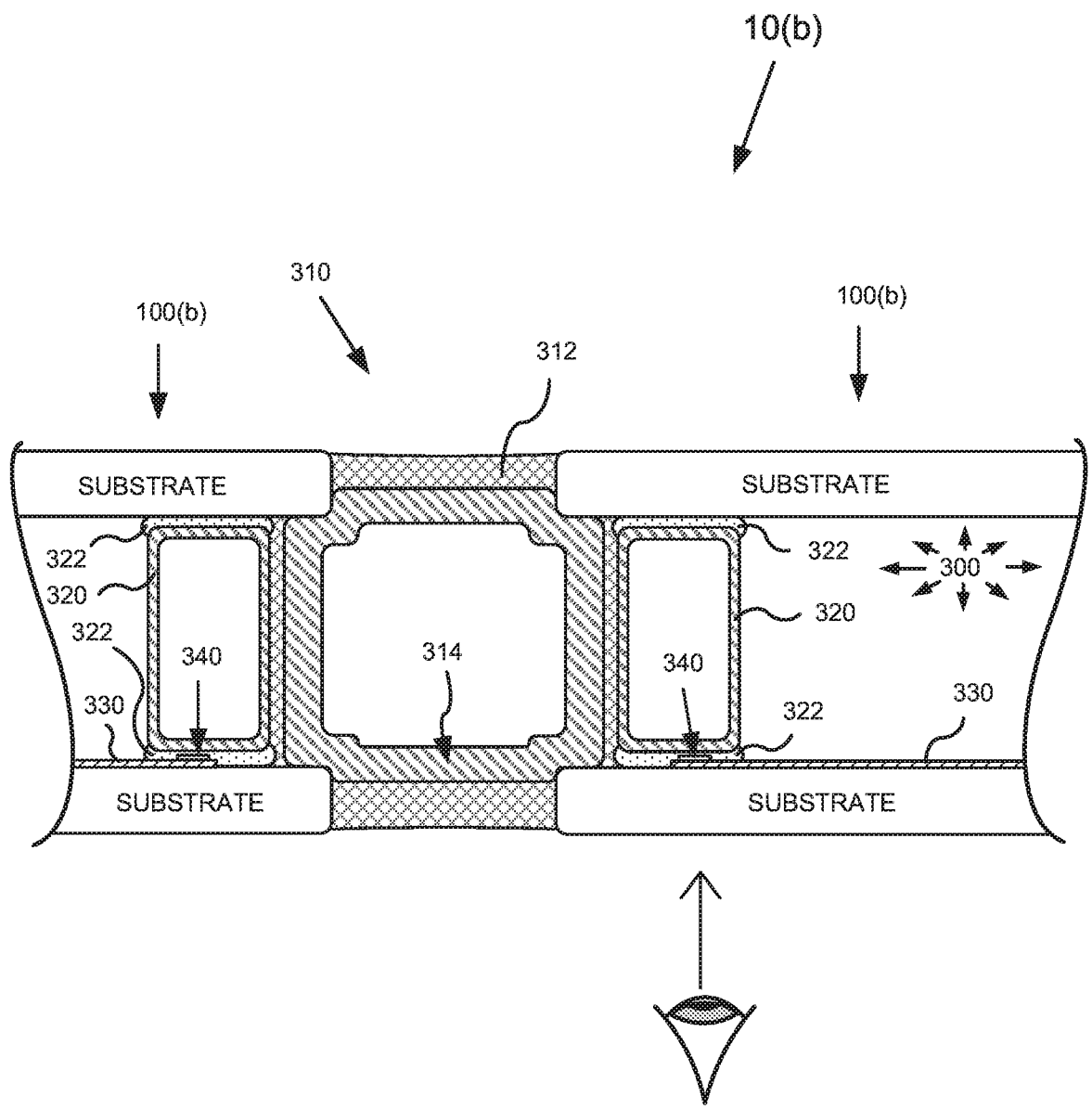
FIG. 3C is a schematic illustration of a cross sectional view of a portion of an electrochromic window assembly including a butt joint between two IGUs butted together, according to embodiments.

FIG. 3C is a schematic drawing of a cross-sectional view of a portion of an EC window assembly 10(b) including a butt joint 310 between two IGUs 100(b) butted together. The butt joint 310in FIG. 3C may be an example of a structure that is used to join the abutted IGUs 100(a) in FIG. 3A. In FIG. 3C, each IGU 100(b) includes two panes, each pane comprising a substantially transparent substrate (e.g., glass or polymer substrate). For each IGU 100(b), one of the substrates includes an EC device 330 on a portion of the inner surface. In other embodiments, both substrates may have EC devices 330 and/or the EC devices 330 may be on different surfaces of the substrates.

In FIG. 3C, the butt joint 310 includes a structural member 314 having a generally rectangular cross-sectional shape. The structural member 314 have opposing vertical and horizontal legs that provide structural support by locating structural member 314 between the opposing panes, at last partially in the secondary seal area of the adjoining IGUs. Depressions along the four corner edges of the structural member 314 are configured to interface with the panes of the IGUs. Although not shown, wires for electrical connectivity between the EC devices 330 and other elements may run in the center volume of the structural member 314.

In FIG. 3C, there is at least some secondary sealant 312 (e.g., black silicone) between the structural member 314 and each spacer 320 and primary seal 322. The IGUs 100(b) have an interior space 300, which may be filled with an inert gas such as argon and pressurized. In this example, there is no framing or flashing used that extends outside of the exterior surfaces of the substrates, there is only secondary sealant 312 between substrate edges. Bus bars 340 for powering the EC devices 330 are located between the spacer 320 and the edge of the EC devices 330. The illustrated eye shows the perspective of an observer viewing the EC window assembly 10(b) from the outside. As illustrated, the observer can view, through the glass, bus bar 340 under the spacer 320 unless the techniques for obscuring bus bars of certain embodiments described herein are used. There is no frame, flashing or other material to block the observer's line of sight, the bus bars are obvious and visually distracting. As depicted, the observer can view the bus bar or uncoated region through the proximal pane when viewing the IGU 100(b) from the outside.

Other implementations include an EC window assembly with structural sealant joining adjacent IGUs without a structural member between the IGUs. An EC window assembly with structural sealant joints between IGUs can be used to achieve a glass wall visual effect to an outside observer. Each structural sealant joint comprises a sealant between the adjacent IGUs being joined and mounted to a facade of a building or other facility. The structural sealant joint is designed to allow one or more IGUs to be mounted to the facade with minimal to no front side clamping, thus maximizing the amount of visible area to an outside observer. The structural sealant joint includes a sealant and no framing structure between the spacers of the IGUs being joined. An adhesive is located between the inner surface (sometimes referred to as "S4") of the IGUs being joined and the framing system. The sealant between the IGUs comprises material(s) that are resistant to ultraviolet degradation and strength sufficient to transfer wind and environmental loads at the outside surface of the IGUs to the framing system of the facade. Examples of materials suitable as sealants between the IGUs include silicone based materials such as a silicone rubber gasket material or a silicone polymer. A commercially available example of a suitable silicone-based material is Dow Corning® 121 Silicone Structural Glazing Sealant made by Dow Corning. When the structural sealant is made of a silicone-based material, the joint is sometimes referred to as a structural silicone glazing (SSG) joint. The space or trench between the IGUs is filled with the structural sealant and/or a backer rod (e.g., a foam cylinder) to take up volume. The structural strength of the joint largely comes from the adhesive material (e.g., silicone or acrylic tape) sealed between the inner surface or "S4" of the IGUs and the framing system. Generally, the adjacent IGUs are separated by a small distance. For example, adjacent IGUs may be separated by a distance of between 0.25 inches to 1 inch. In one example, adjacent IGUs are separated by a distance of about ¾ inch. The distance between the IGUs may vary depending on the spacing of the framing system.

In implementations of an EC window assembly that uses structural sealant (e.g., SSG) joints, these joints can be along two, three or four sides. In one implementation, each of the four (4) IGUs 100(a) shown in FIG. 3A can be joined to adjacent IGUs 100(a) with structural sealant joints at two, three or four sides, according to an implementation. In certain implementations, the EC window assembly is "two-sided" with structural sealant joints along two of the four sides. The other two edges may have non-structural covers on the front side that are cosmetic and/or provide a partial water barrier. In other implementations, the EC window assembly is "four-sided" with structural sealant joints along four sides. In these implementations, both of the lites of each IGU are generally supported on the bottom edge by a shelf.

Figure 3D:
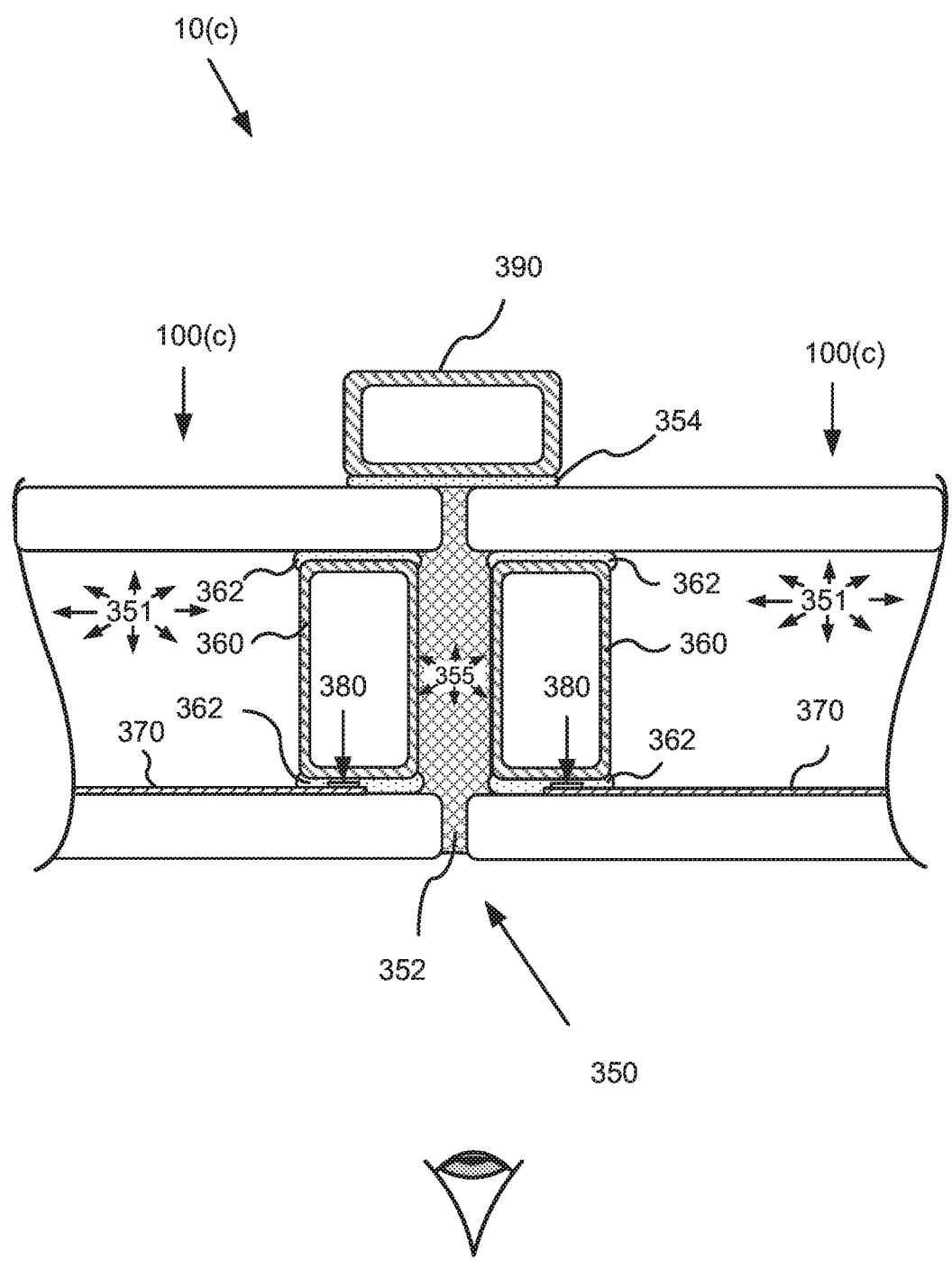
FIG. 3D is a schematic illustration of a cross sectional view of a portion of an electrochromic window assembly with a structural sealant joint between two IGUs joined to a building façade, according to an embodiment.

FIG. 3D is a schematic illustration of a cross sectional view of a portion of an electrochromic window assembly 10(c) including a structural sealant joint 350 between two IGUs 100(c) joined to a frame 390 of a building façade, according to an embodiment. The structural sealant joint 350 is an example of a structure that can be used to join the IGUs 100(a) in FIG. 3A. In FIG. 3D, each IGU 100(c) includes two panes, each pane comprising a substantially transparent substrate (e.g., glass or polymer substrate). For each IGU 100(c), one of the substrates includes an EC device coating 370 on a portion of the inner surface. In other implementations, both substrates may have EC devices 370 and/or the EC devices 370 may be on different surfaces of the substrates. Although the frame 390 is shown as a single element having a rectangular cross-sectional shape, it would be understood that other shapes or combination of shapes could be used.

In FIG. 3D, the structural sealant joint 350 includes a sealant 355 (e.g., black silicone) filling the space or trench 355 between the spacers 360 and primary seals 362 of the adjacent IGUs 110(c). Alternatively, baker rod (e.g., a foam cylinder (not shown)) and sealant 355 can be used in fill in the volume of the space or trench 355. The IGUs 100(c) also have an interior space 351 between the substrates, which may be filled with an inert gas such as argon and pressurized. In this example, there is no framing or flashing used that extends outside of the exterior surfaces of the substrates, there is only secondary sealant 362 between substrate edges.

Bus bars 380 for powering the EC devices 330 are located under the spacers 320 and at the edges of the EC devices 330. The illustrated eye shows the perspective of an observer viewing the EC window assembly 10(c) from the outside. As illustrated, the observer can view, through the outer substrate, the bus bar 380 under the spacer 380 unless the techniques for obscuring bus bars of certain implementations described herein are used (the EC device is transparent as well as the substrate, so the bus bar can be seen). As shown, there is no frame, flashing or other material illustrated to block the observer's line of sight, the bus bars 380 are obvious and visually distracting. As depicted, the observer can view the bus bar 380 or uncoated region of the substrate through the outer substrate when viewing the IGU 100(c) from the outside. Although not shown, wires for electrical connectivity to the bus bars 380 may also be included.

Embodiments disclosed herein relate generally to techniques for obscuring from view bus bars and other features within an EC glass structure assembly. Some examples of these techniques are described below, in some cases with reference to the Figures. For example, certain embodiments are directed to camouflaging visible features to blend in with their background. As another example, certain embodiments are directed to adding an obscuring layer between the visible feature and the observer to obscure it from view. In another example, certain embodiments are directed to transparent or substantially transparent features.

A. Camouflaging Techniques

In certain embodiments, camouflaging techniques may be used to make the bus bar or other visible feature in the EC window assembly the same or similar color as the "background." "Background" can refer to the element or elements of the EC window assembly that are visible from the outside of the assembly and are from the viewpoint of the observer behind the feature being camouflaged. In many cases, the "background" to a bus bar is the spacer or sealant in a primary seal of an IGU. In FIG. 3C, for example, the background to the bus bars 340 is the sealant 322. In another illustrated example shown in FIG. 3D the background to the bus bars 370 is the primary sealant 362. Black and gray are common background colors, although other colors may apply. The goal of camouflaging techniques is to reduce the contrast between the bus bar or other visible feature and the background (e.g., sealant and/or spacer).

Certain implementations of camouflaging techniques described herein can reduce the contrast in color (hue) and/or brightness (luminance) between the foreground feature being camouflaged and its background. One metric of the difference in brightness is a luminance contrast ratio between the measured luminance of the background and measured luminance of the feature being camouflaged. Examples of different luminance contrast ratios that can be used include Weber contrast ($C_w=(L_f-L_b)/L_b$), Michelson contrast ($C_{mich}=(L_{max}-L_{min})/(L_{max}+L_{min})$), Luminance ratio ($CR=L_f/L_b$), and RMS contrast, where $L_f$ is the measured luminance of the feature and $L_b$ is the measured luminance of the background. One metric of a difference in color contrast is the Delta E (or $\Delta E$) developed by the International Commission on Illumination (CIE). Other measurements of color contrast may also be used such as CIE76, CIE94, CIEDE2000, etc.

In certain embodiments, a tinting agent can be added to the material used to fabricate the bus bar to mask its normal color and brightness and make it the same or similar to the background. Since black is a common background color, carbon black, or graphite may be used as a tinting agent in some cases. In certain cases, the tinting agent and/or the amount of tinting agent is selected based on measured luminance contrast ratio and measured color contrast (e.g., measured Delta E) between the final color of the bus bar and the background. In one case, the tinting agent and/or amount of tinting agent is selected to be within a range of acceptable contrast values.

In some embodiments, bus bars may be fabricated from non-conventional bus bar materials that have the same color or similar color to the background and are also electrically conductive such as, for example, certain carbon-based materials. Some examples of suitable carbon-based materials include materials having carbon black, graphite, graphite-based materials, graphene, graphene-based materials, etc. These materials have been shown to have excellent electrical conductivity and may be processed to fabricate conductive strips or similar structures suitable for bus bars.

In other embodiments, the features in the background of the bus bar may be fabricated to have the same or similar color as the bus bar (or other visible feature being camouflaged). For example, tinting agents may be added to the sealant or a coating applied over the sealant to make the sealant the same or similar color as the feature being camouflaging.

Certain camouflaging techniques implement bus bars that are comprised of a material that darkens upon exposure to heat and/or sunlight. For example, the bus bars may comprise a thermochromic material (e.g., vanadium oxide) and/or photochromic material (or, e.g. as described in relation to FIG. 4A, 4B or 4D, a thermochromic and/or photochromic coating may be applied at an intervening position to block the line of sight). When sunlight impinges on the bus bars, this material darkens where it is exposed to heat from solar energy and/or exposed to direct sunlight. The darkened bus bars are less reflective of sunlight and thus appear to contrast less in brightness (be less shiny) against the background than had the bus bars not been darkened. In embodiments where intervening thermochromic and/or photochromic layers are used, they darken and reflective bus bar surfaces are less noticeable than they otherwise would be without the intervening darkening layers to obscure them. In certain implementations, bus bars comprise a surface layer of a material that darkens upon exposure to heat and/or sunlight. In other cases, bus bars may incorporate this material that darkens with other materials used during the formation of the bus bars, for example, by co-depositing bus bar materials e.g., by plasma deposition. Some examples of methods of forming bus bars that can be used to co-deposit these materials that darken are described in U.S. Provisional Application 62/428,999, titled "METAL ACCRETION BUS BARS" and filed on Dec. 1, 2016, which is hereby incorporated by reference in its entirety.

B. Intervening Obscuring Layer from View Techniques

In certain embodiments, techniques may be used to form an opaque obscuring layer between the bus bar and an observer to block the view of the bus bar from the observer. In certain cases, the obscuring layer is made of a material having a color that is the same or similar to the background. A tinting agent may be used in the opaque obscuring layer. The obscuring layer has at least a width needed to prevent an observer from viewing the bus bar being obscured from a range of viewing angles or from all possible viewing angles (i.e. vantage points). For example, the obscuring layer has a width that is at least the width of the bus bar. In these embodiments, there will be at least one TCO layer between the bus bar and the obscuring layer. In certain embodiments, the intervening layer is thermochromic and/or photochromic; i.e. it darkens when warm and/or upon exposure to light. Thus the reflective properties of the underlying bus bar are obscured. In certain embodiments, one or more intervening layers of thermochromic and/or photochromic materials may be used to obscure and/or block the line of sight to the bus bars.

In one embodiment, a tinted coating can be applied between the bus bar and the EC coating's top TCO to mask its normal color and make it the same or similar to the background color. The tinted coating may have a tinting agent as discussed above. Similarly, the color of the tinted coating may be selected so that the contrast between the tinted coating and the background has a luminance contrast ratio and/or color contrast within a range of acceptable values. Preferably the tinted coating is electrically conductive, e.g. if it covers the entire area that the bus bar occupies on the EC coating.

Figure 4A:
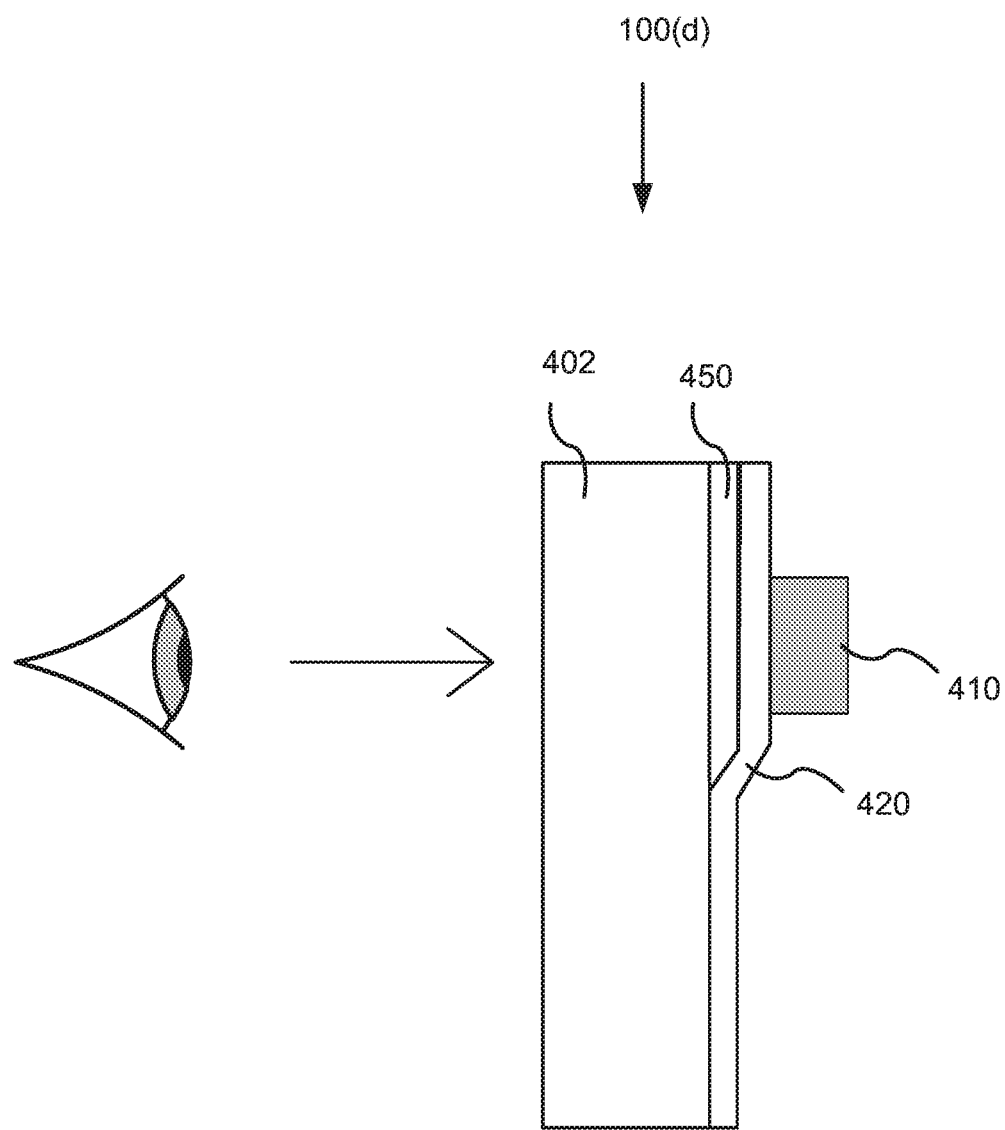
FIG. 4A is a schematic drawing of a portion of an electrochromic pane having an opaque obscuring layer, according to embodiments.

In another embodiment, a tinted coating is applied between the EC coating and the transparent substrate. FIG. 4A is a schematic drawing of a portion of an EC pane 100(d) having an opaque obscuring layer 450, according to embodiments. The illustrated eye shows the perspective of an observer viewing the EC pane 100(d) from the outside. In the illustrated example, the single pane includes a substantially transparent substrate 402 having one or more layers of an EC device 420. These layers include one or two TCO layers. The bus bar 410 is formed on the one or more layers of the EC device 420. The opaque obscuring layer is formed between the one or more layers of the EC device 420 and the substantially transparent substrate 402 in a region adjacent the bus bar 410. As illustrated, the observer is blocked from being able to view the bus bar 410 by the obscuring layer 450. Obscuring layer 450 is depicted as being approximately as thick as coating 420, but this is not necessary. Layer 450 may be much thinner. For example, a typical EC device coating may be on the order of 1 micron thick; while the obscuring layer can be between about 1 nm and 500 nm thick; between about 1 nm and about 100 nm thick; between about 1 nm and about 50 nm thick; or between about 1 nm and about 10 nm thick. The obscuration layer may be sputter deposited, e.g. a metal oxide, metal, or other material. The obscuration layer may be selectively applied, e.g. in the desired areas, or e.g. applied across the entire glass surface and selectively removed from areas where it is not desired. In the latter example, plasma or laser may be used to remove the obscuration layer material from the substrate. The obscuration layer may be more than one layer of material. The material may be opaque or not, continuous or have an open cellular structure, or be a pattern of shapes and the like. The material may be actively coloring, rather than static, for example the material may be thermochromic and/or photochromic. A combination of materials may be used, active or not, patterned or not, depending on the application and desired effect to obscure the bus bars.

Referring back to FIG. 3C, bus bar 340 can be blocked from view with an obscuring layer located between the bus bar 340 and one or both of the TCOs in the EC device 330 or between the EC device 330 and the substantially transparent substrate. The width of the obscuring layer is at least the width of the bus bar 340. In this example, the obscuring layer may be made of material having the same or similar color to sealant 322 that is background to the bus bar 340.

Similarly, referring back to FIG. 3D, bus bar 380 can be blocked from view with an obscuring layer located between the bus bar 380 and one or both of the TCOs in the EC device 370 or between the EC device 370 and the substantially transparent substrate. The width of the obscuring layer is at least the width of the bus bar 380. In this example, the obscuring layer may be made of material having the same or similar color to sealant 362 that is background to the bus bar 380 or, e.g., a thermochromic and/or photochromic material.

Figure 4B:
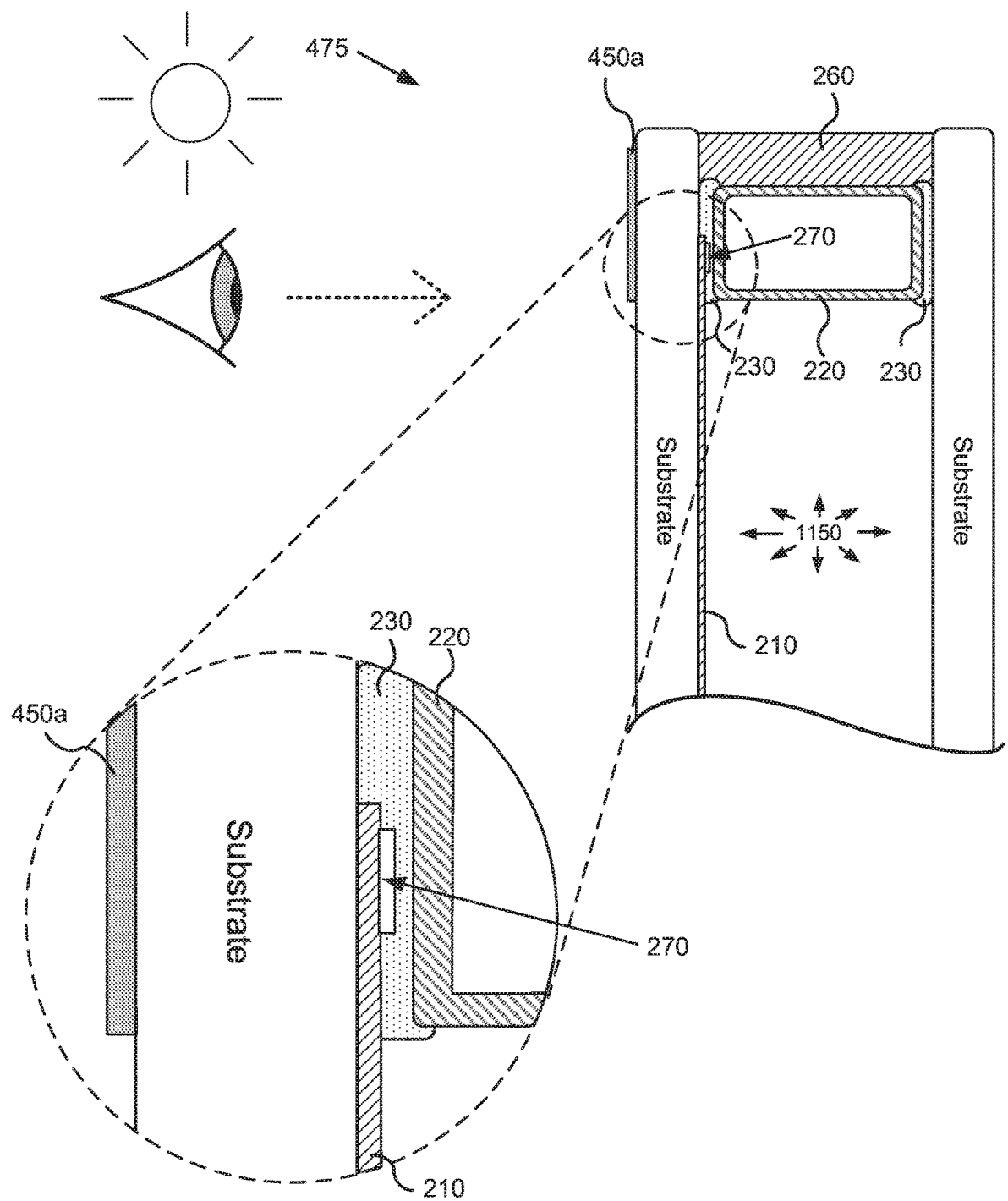
FIG. 4B is a schematic drawing of an electrochromic pane having an opaque obscuring layer, according to embodiments.

Referring back to FIG. 1A, bus bar 1 160(*a*) can be blocked from view with an opaque obscuring layer located between the first TCO and the diffusion barrier or between the diffusion barrier and the substrate under bus bar 2 160(*b*). Bus bar 2 160(*b*) can be blocked from view with an opaque obscuring layer located outside the second TCO under bus bar 1 160(*a*). FIG. 4B depicts an insulated glass unit, 475, with a strip of an obscuration layer (or material), 450*a*, on surface 1 or "S1" (facing the exterior environment). The strip of the obscuration material is located to be substantially parallel to the direction of the bus bar. Unlike conventional obscuration layers that are applied in the viewable area (sometimes referred to as a "working region" between an edge of an electrochromic film and the inner perimeter of the spacer) in certain embodiments no portion of 450*a* is configured within the viewable area of the window, but rather it only obscures bus bar 270 from the view of an outside observer. Since advanced electrochromic window designs, e.g., those commercially available from View, Inc. of Milpitas, Calif., fabricate bus bars under the spacer (between the glass and spacer 220, e.g.) the bus bars are not viewable from the interior of the building. Also, the obscuration layer 450*a* need not encroach into the viewable area of the glass. The viewable area is defined by the inner perimeter of the spacer, e.g. spacer 220 as depicted. As the primary sealant, 230, may encroach past the inner perimeter of the spacer (see expanded view in FIG. 4B, e.g.), this may define the perimeter of the viewable area. In one embodiment the obscuration layer does not encroach into viewable area, for example, it is aligned with the perimeter of the viewable area or inset from the perimeter of the viewable area. In another embodiment, the obscuration layer encroaches into the viewable area less than 5 mm, less than 3 mm, or less than 2 mm, or less than 1 mm. In certain embodiments, the obscuration layer is inset from the viewable area perimeter by about 1 mm, about 2 mm, about 3 mm or about 5 mm. The obscuration material may extend to the outer perimeter of the glass upon which it resides or be inset from the glass edge, e.g. at the inset values described above. By insetting the obscuration material from the outer perimeter of the glass, it is protected from physical handling and damage; though in certain embodiments it may extend to the edge of the glass and optionally around the edge of the glass (e.g. to obscure reflections from the edge of the glass). Obscuration layers on surface 1, e.g. 450*a*, may be exposed to the environment as depicted in FIG. 4B. In such embodiments, the obscuration layer material may be made of a durable, weather resistant material, e.g. resistant to solar radiation, weathering, handling and cleaning. Obscuration layer 450*a* may be a paint, a polymeric coating, a tape, metal strip, foil, shim stock and the like. In one implementation, the obscuration layer 450*a* is a strip of thin flexible glass material (e.g., Willow™ glass which is commercially available from Corning, Incorporated of Corning N.Y.) adhered using an adhesive such as silicone sealant. If a strip, tape or shim stock it may have an adhesive backing, for example, for "peel and stick" applications. Examples of suitable materials include, sealant such as Dow Corning 795 sealant, UV curable inks, SOLYX Exterior Opaque Black gloss cast vinyl window film SXV-9-1003, City Theatrical Blacktak Light Mask Tape, Horizons ISG Durablack laser markable anodized aluminum sheet with 3M 350 PSA adhesive backing, CRL Black Butyl architectural glazing tape, glass frit baked onto surface 1 of the exteriorly oriented lite, and the like. If liquid or gel form is used a medium to apply the obscuration material, the obscuration layer may be applied for example by screen printing, spraying, ink jet printing and the like. As discussed in further detail below, with reference to FIG. 4D, obscuration coating 450*a* may also be laminated between a lite of an IGU and a lamination partner, thus 450*a* does not have to be on S1, it may be in or part of a lamination adhesive or on the inner surface of the lamination partner.

Figure 4C:
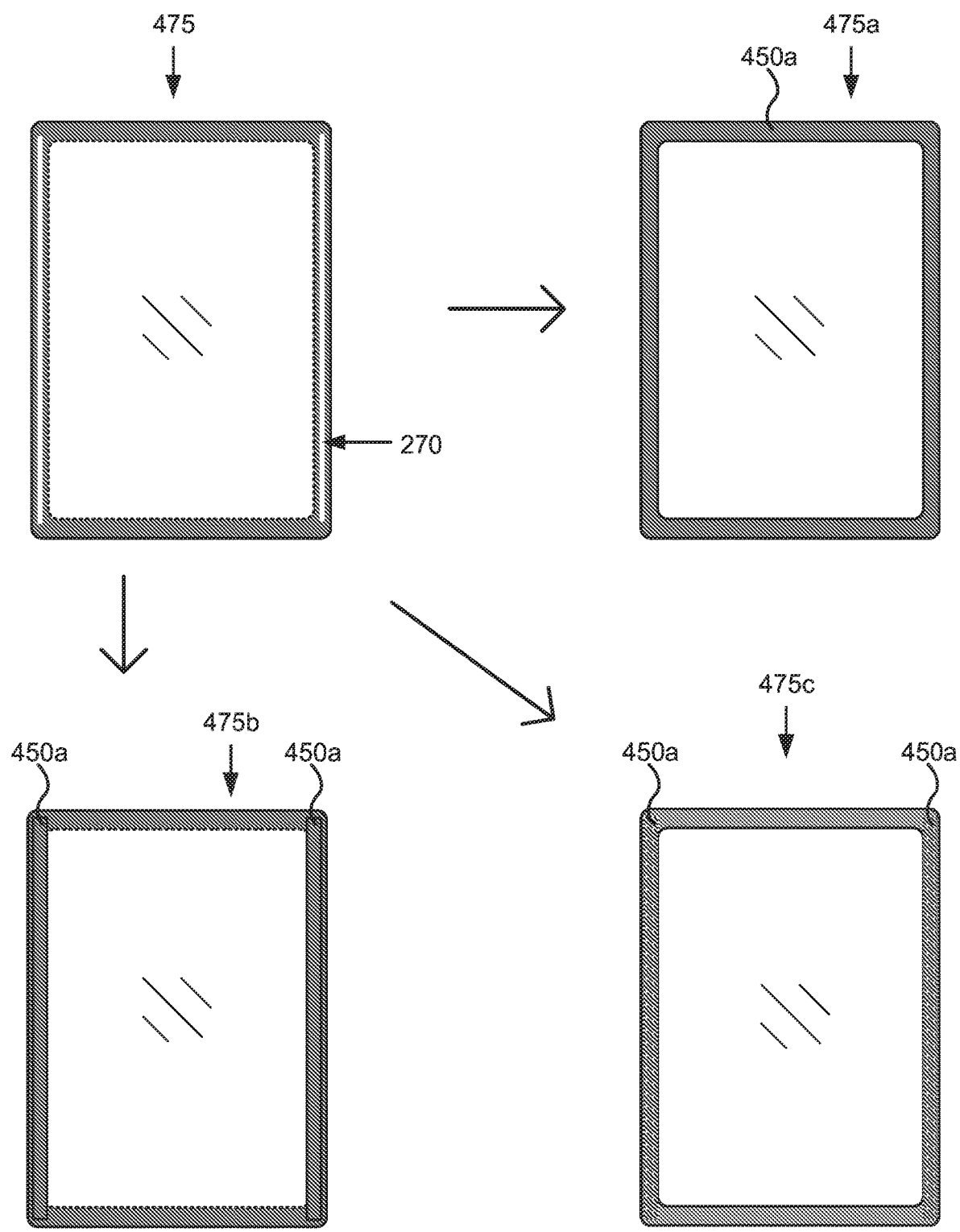
FIG. 4C is a plan view of the electrochromic pane from FIG. 4B.
Figure 4D:
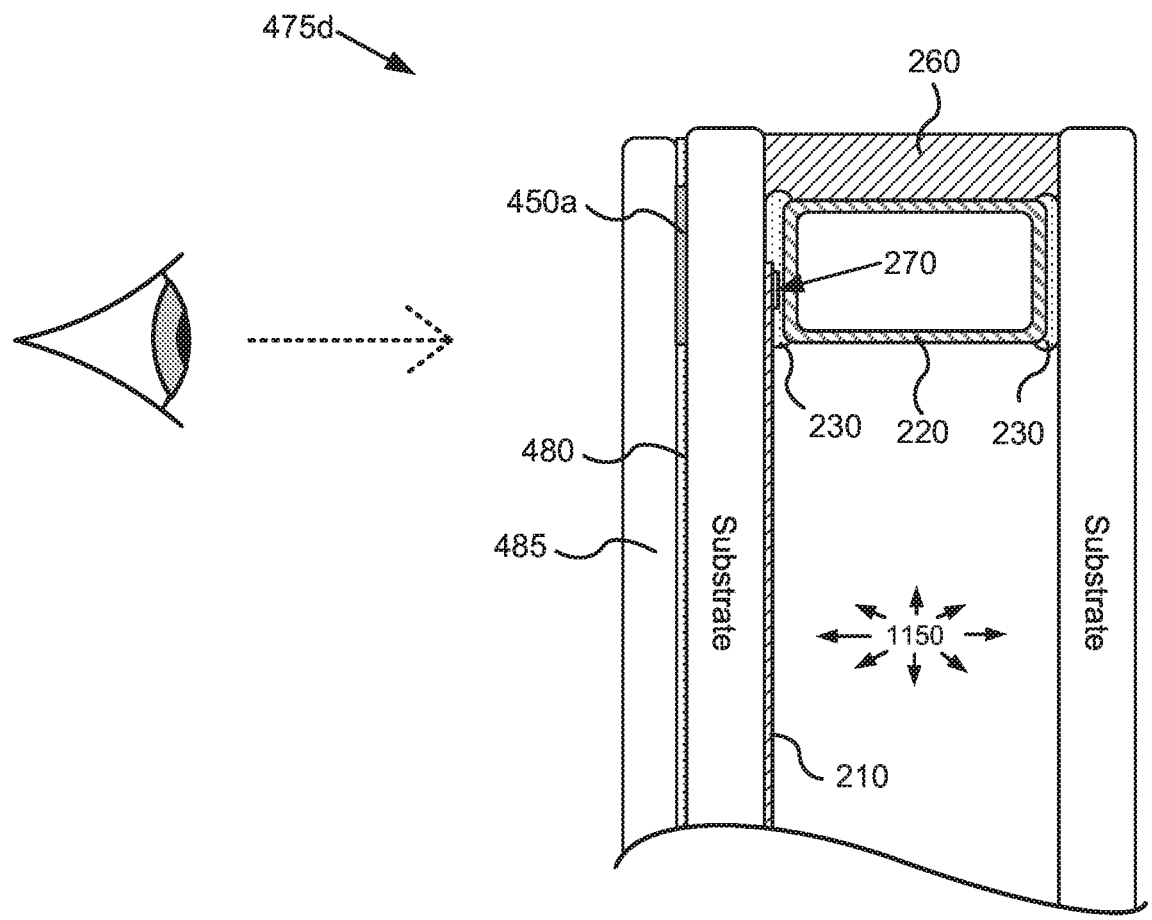
FIG. 4D is a schematic drawing of the electrochromic pane in FIG. 4B, showing a lamination pane.

FIG. 4C depicts plan views of IGU 475, before and after application of obscuration material 450*a*. As shown, conventional bus bars 270, by virtue of being e.g. silver based and thus highly reflective, have a high contrast as against e.g. a background of IGU sealant, such as black colored PIB. In a butt joint application (refer e.g. to FIG. 3C and associated description) or in structural sealant joint (refer, e.g., to FIG. 3D and associated description) these bus bars are highly visible and can be distracting from the aesthetics of the window installation. Referring to 475*a*, obscuration material 450*a* is applied around the perimeter of surface 1 in order to hide the bus bars. In this example, the obscuration material is colored to substantially match the PIB or other sealants color and/or the color of the spacer. Since the obscuration material is not in the viewable area, or encroaches only very little, viewable area is maximized. Referring to 475*b*, obscuration material 450*a* is applied as strips that cover the bus bar areas only, rather than the entire perimeter of the window. Referring to 475*c*, obscuration material 450*a* is applied in a patterned (e.g. dots, or other shapes) fashion that cover the bus bar areas only, rather than the entire perimeter of the window. In an alternative embodiment, the patterned obscuration material is applied around the entire perimeter, as in 475*a*, but in a patterned area, rather than a solid area. Unlike conventional obscuration materials, the patterning does not extend into the viewable area (or does so very little) as there is no bus bar (or dead zone without electrochromic coating) in the viewable area.

As mentioned above, and referring to FIG. 4D, obscuration layer or material 450*a* may be configured in between two lamination partners. For example, IGU 475*d* includes IGU 200 (refer to FIG. 2A and associated description) and includes a lite, 485, which is laminated to IGU 200, to make the final construct 475*d*. A lamination adhesive, 480, may be for example, a resin lamination adhesive. The lamination adhesive may be used to color match or otherwise modify the bleached and/or colored state of the electrochromic window. Lamination, particularly resin lamination, of pre-existing electrochromic IGU's is described, for example, in U.S. Pat. No. 8,164,818, titled "Electrochromic Window Fabrication Methods" which is hereby incorporated by reference for all purposes. Advantages of lamination of pre-existing IGUs (rather than choosing and committing to a lamination partner upstream of IGU fabrication) allows for much greater flexibility in manufacturing choices, i.e. lamination partner 485. Thus electrochromic IGUs are fabricated and only later must one decide what to laminate to the IGU, if desired.

Lamination partner, or pane, 485, may be glass, plastic or other suitable material. In certain embodiments, pane 485 is inset from the edge of the IGU pane to which it is laminated. In some embodiments, pane 485 is thin glass, e.g. thin flexible annealed glass. Exemplary thin flexible glass includes thin and durable glass materials, such as Gorilla® Glass (e.g. between about 0.5 mm and about 2.0 mm thick) Willow™ Glass, and Eagle™ Glass, each commercially available from Corning, Incorporated of Corning N.Y. In one embodiment, the flexible glass is less than 1 mm thick, in another embodiment the flexible glass is less than 0.7 mm thick, in another embodiment the flexible glass is less than 0.5 mm thick, in another embodiment the flexible glass is less 0.3 mm thick, and in another embodiment the flexible glass is about 0.1 mm thick. In certain embodiments, the thin flexible glass may be less than 0.1 mm thick. Such substrates can be used in roll-to-roll processing to apply the glass to the electrochromic lite during lamination. Also, with thin glass "peel and stick" adhesive technologies are easily implemented.

Referring again to FIG. 4D, in certain embodiments, obscuration layer 450a may be applied to S1 of IGU 200 prior to lamination with pane 485. In some embodiments, obscuration layer 450a may be applied to S2 of pane 485 and then pane 485 is laminated to IGU 200. In other embodiments, obscuration layer 450a is applied to or is part of lamination adhesive 480.

In one embodiment obscuration layer 450a, e.g. as described in relation to FIG. 4A-D, is combined with one or more bird friendly features, e.g. as described in United States Patent applications, Ser. Nos. 62/191,182, 61/238,609 and 62/269,721, filed on Jul. 10, 2015, Oct. 7, 2015 and Dec. 18, 2015, respectively; each of which is hereby incorporated by reference for all purposes. For example, bird friendly features, such as patterns, may be applied to one or both surfaces of pane 485, S1 of IGU 200, and/or as part of lamination adhesive 480 (e.g. UV reflecting or scattering particles may be incorporated into adhesive 480).

Although generally the obscuration layer described in examples herein is made of an absorptive material for absorbing light, in other aspects, the obscuration layer is made of or contains a reflective or transparent material. In certain aspects, for example, the obscuration layer is made of a thin metal film or a reflective polymer. This reflective obscuration layer can be disposed in any configuration as described herein with respect to obscuration layers/materials. In one embodiment, rather than a monolithic layer or sheet of the reflective material, particles of the material are used to scatter light and thereby obscure the bus bar.

C. Transparent or Otherwise Optically Unobtrusive Bus Bars and Other Transparent Features In certain embodiments, obscuring techniques include fabricating and using a transparent, substantially transparent bus bar, or otherwise optically unobtrusive bar. In these cases, the bus bar will not be visibly discernible and/or visually distracting to an observer. An observer viewing the general area of the bus bar will see through the bus bar and to any background (primary sealant and/or spacer) behind the bus bar or in the case of a transparent bus bar in the viewable area, will see through bus bar in the viewable area.

For example, if the bus bar 340 shown in FIG. 3C were fabricated to be transparent or substantially transparent, the observer from the vantage point of the illustrated eye outside the EC glass structure would view the sealant 322 when the EC device 330 is in the untinted state (or tinted but still allowing some light to pass through). As another example, if bus bar 1 160(a) shown in FIG. 1A is fabricated to be transparent or substantially transparent according to an embodiment, the observer from the vantage point of the illustrated eye would view through the bus bar in the visible area of the IGU, thus avoiding a visually distracting, high contrast bus bar.

According to certain embodiments, a transparent or substantially transparent bus bar may be fabricated from a transparent or substantially transparent material having electrically conductive properties. For example, the transparent or substantially transparent bus bar may be made from an ITO or other TCO doped with an electronically conductive agent such as conductive nanowires or other conductive nanostructure. Although the dopant may introduce haze, the bus bar will be far less visible than a conventional bus bar. In certain cases, any haze that may be introduced will not be a problem since the bus bar will be viewed in contrast to its background (e.g., sealant). In these cases, the contrast between the bus bar and the background will be minimal and may not be discernable by an observer from outside the EC glass structure. In certain cases, the transparent bus bar may be fabricated by screen printing a transparent or translucent ink containing metal nanoparticles, or by using masks during sputtering to produce a thicker region of the TCO that serves as the transparent bus bar. Also, low-haze metal doped transparent conductor materials are described in the current literature. These low-haze materials can be used for transparent bus bars.

Optically Unobtrusive Bus Bars Within Viewable Region

In certain embodiments, one or more transparent or substantially transparent or otherwise optically unobtrusive bus bars may be formed on an EC lite within the viewable region of the EC window. The viewable region can refer to the area of the EC window where an observer can generally see through the window when the EC device(s) are in a clear state. The viewable region is typically defined by the inner perimeter of the IGU spacer and/or the inner perimeter of a frame. Possible advantages of having bus bars in the viewable region are to improve switching uniformity and increase speed of transition between optical states. These advantages may become more significant as EC lites and their associated windows assemblies are scaled up in size as techniques for manufacturing EC coatings become more sophisticated.

In some cases, the transparent or substantially transparent or otherwise optically unobtrusive bus bars may be made of one or more materials selected such that the refractive index of the entire EC device stack and the optically unobtrusive bus bar less visibly distracting. In these cases, the material of the bus bar may be selected for a refractive index to tune the material properties of the bus bar and EC stack to make the bus bar less distinctive visually. For example, the material of the bus bar and/or other material layers of the EC stack may be selected to avoid an interference pattern. For example, the transparent bus bar may have a refractive index that approximates the TCO upon which it rests or the substrate, e.g. the transparent bus bar has a refractive index of between about 1.3 and about 2.0. Although this technique is described with respect to a bus bar in the viewable region, this technique may also be implemented for a bus bar under the spacer.

In some cases, the transparent or substantially transparent or otherwise optically unobtrusive bus bars may be made of a conductive and/or substantially transparent material. In some cases, these bus bars may be made of a thin layer of metal or metal alloy. In one example, the bus bar has a thickness in the range of 1 nm and 10 nm. In another example, the bus bar has a thickness of less than about 3 nm. In yet another example, the bus bar has a thickness of less than about 5 nm. Additionally or alternatively, the bus bars have a relatively narrow width to provide a narrow profile visible to an outside observer. In one example, the bus bars have a width of about 0.1 mm. In another example, the bus bars have a width in the range of about 0.05 mm to 0.15 mm. In other embodiments, the optically unobtrusive bus bars may be made of a non-metallic and conductive material. In certain cases, the optically unobtrusive bus bars may be made of silver nanowires or conductive carbon nanotubes (CNT) in a binding paste (i.e. CNT or silver nanowire based pastes). Generally, the length of the bus bars depends on the size and dimensions of the electrochromic device.

In some implementations, a bus bar is thicker than it is wide to have a narrow profile and sufficient electrical conductivity for current/voltage application requirements. For example, a bus bar may have a width of about 0.1 mm and a thickness of about 0.3 mm. If the bus bars are comprised of metal(s) or metal alloys with high electrical conductivity, the width may be less than 0.1 mm and/or the thickness less than 0.3 mm. This technique may also be implemented with a bus bar under the spacer.

Certain implementations have multiple bus bars of a first polarity in electrical connection with one of the transparent conducting oxide layers and/or multiple bus bars of second opposing polarity in electrical connection with the other one of the transparent conducting oxide layers of the electrochromic device. For example, multiple bus bars with narrow visible profiles (e.g., fine metal wires) may be used for applying voltage/current of the same polarity to one of the transparent conducting oxide layers. In these implementations with multiple bus bars, the voltage/current requirement is typically divided amongst the bus bars such that the dimensions of each individual bus bar may be reduced accordingly.

Some implementations pertain to a bus bar that that is formed within a transparent conducting oxide layer (first or second transparent conducting oxide layers) of the electrochromic device. In some cases, a bus bar is formed in each of the first and second transparent conducing oxide layers. To form such a bus bar, the process for depositing the transparent conducting oxide layer is divided into two operations and an intervening operation for applying the bus bar between these two operations. For example, the method for fabricating the electrochromic device may comprise depositing a first portion of the transparent conducting oxide layer, applying the bus bar (e.g., depositing bus bar materials), and depositing a second portion of the transparent conducting oxide layer. In some cases, the bus bar is formed to have one or both edges smoothly ramp up (taper) in thickness. For example, the method may further include a polishing operation prior to the deposition of the second portion of the transparent conducting oxide layer. This polishing operation can polish one or both of the bus bar edges to erode the bus bar profile to have a smooth ramp/taper. In another example, the method may further include a liquid material application operation that uses capillary action to build up material at one or both of the bus bar edges. In one implementation, the intervening operation for applying the bus bar may include depositing metallized lines such as AG nanoparticles. In another implementation, the intervening operation may include plasma deposition. Some examples of methods of forming bus bars using plasma deposition that may be used in this intervening operation can be found in U.S. Provisional Application 62/428,999, titled "METAL ACCRETION BUS BARS" and filed on Dec. 1, 2016, which is hereby incorporated by reference in its entirety. This method having an intervening operation of forming a bus bar within a transparent conducting oxide layer may be implemented with a bus bar in the viewable region, under the spacer, or in other regions.

Figure 5A:
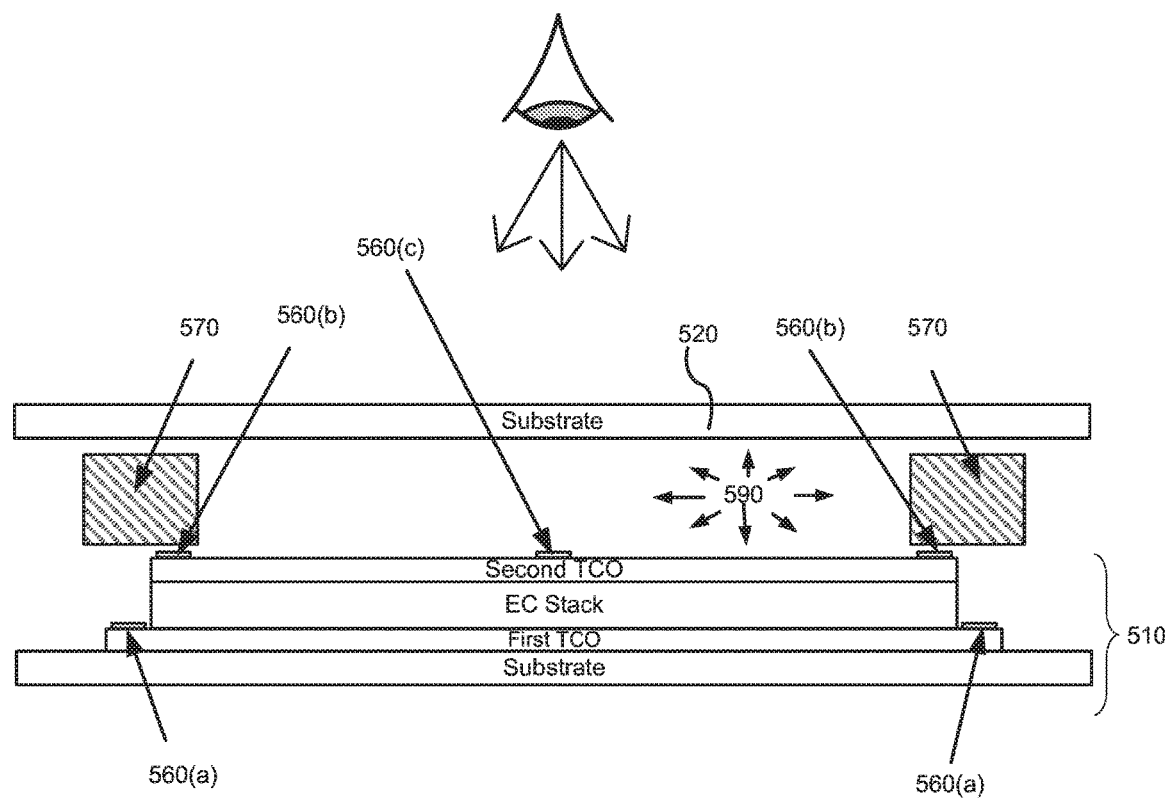
FIG. 5A is a drawing of a cross-sectional view of an EC IGU comprising an optically unobtrusive bus bar within the viewable region, according to an embodiment.
Figure 5A:
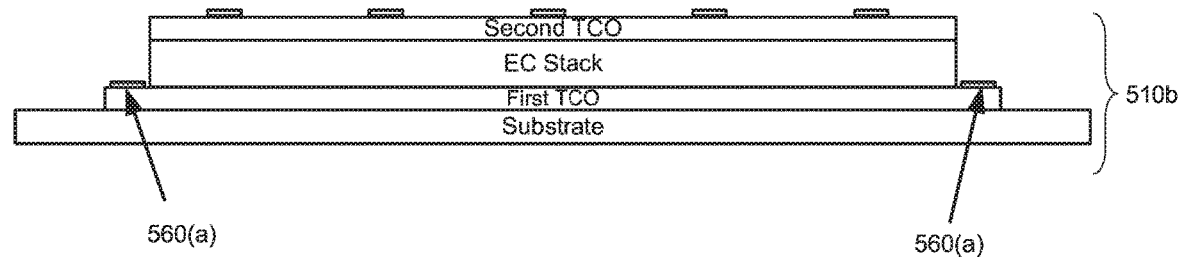
Figure 5B:
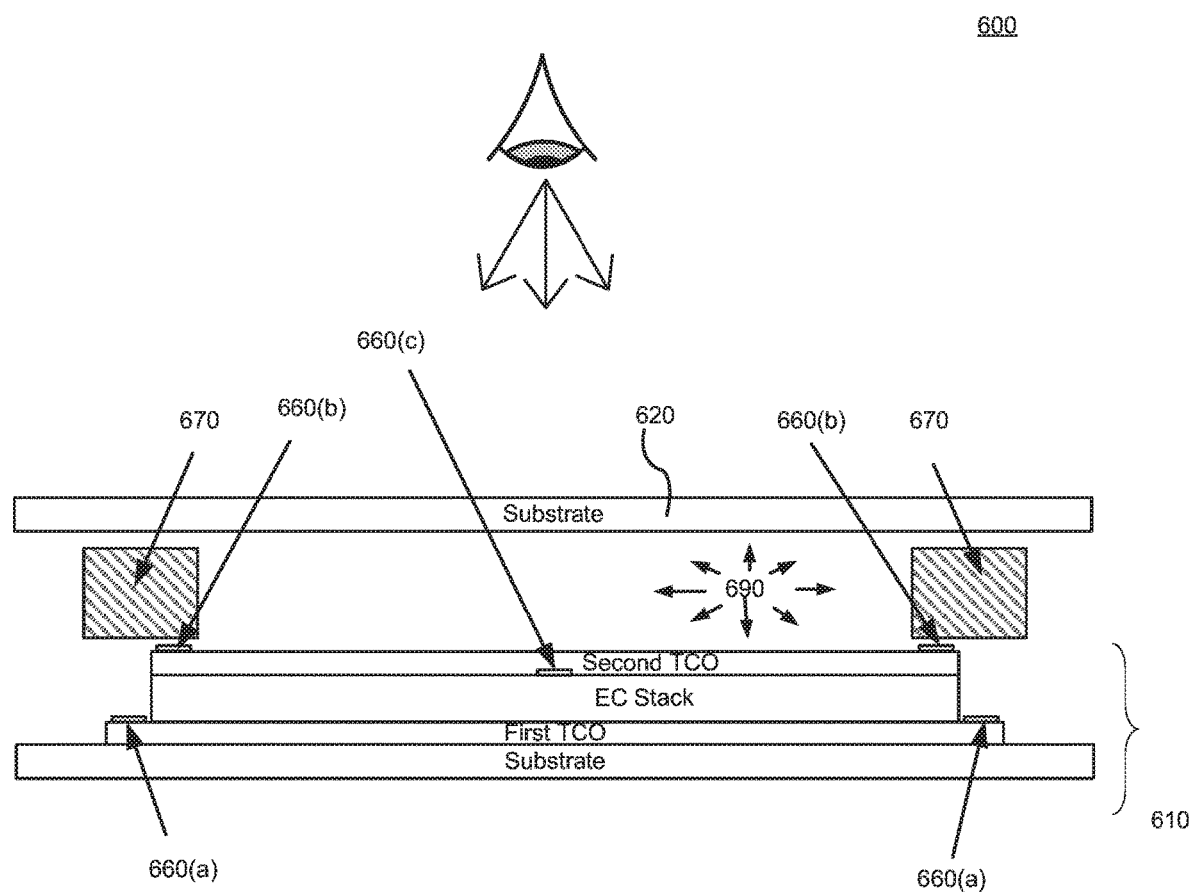
FIG. 5B is a drawing of a cross-sectional view of an EC IGU comprising an optically unobtrusive bus bar within the viewable region, according to an embodiment.
Figure 5C:
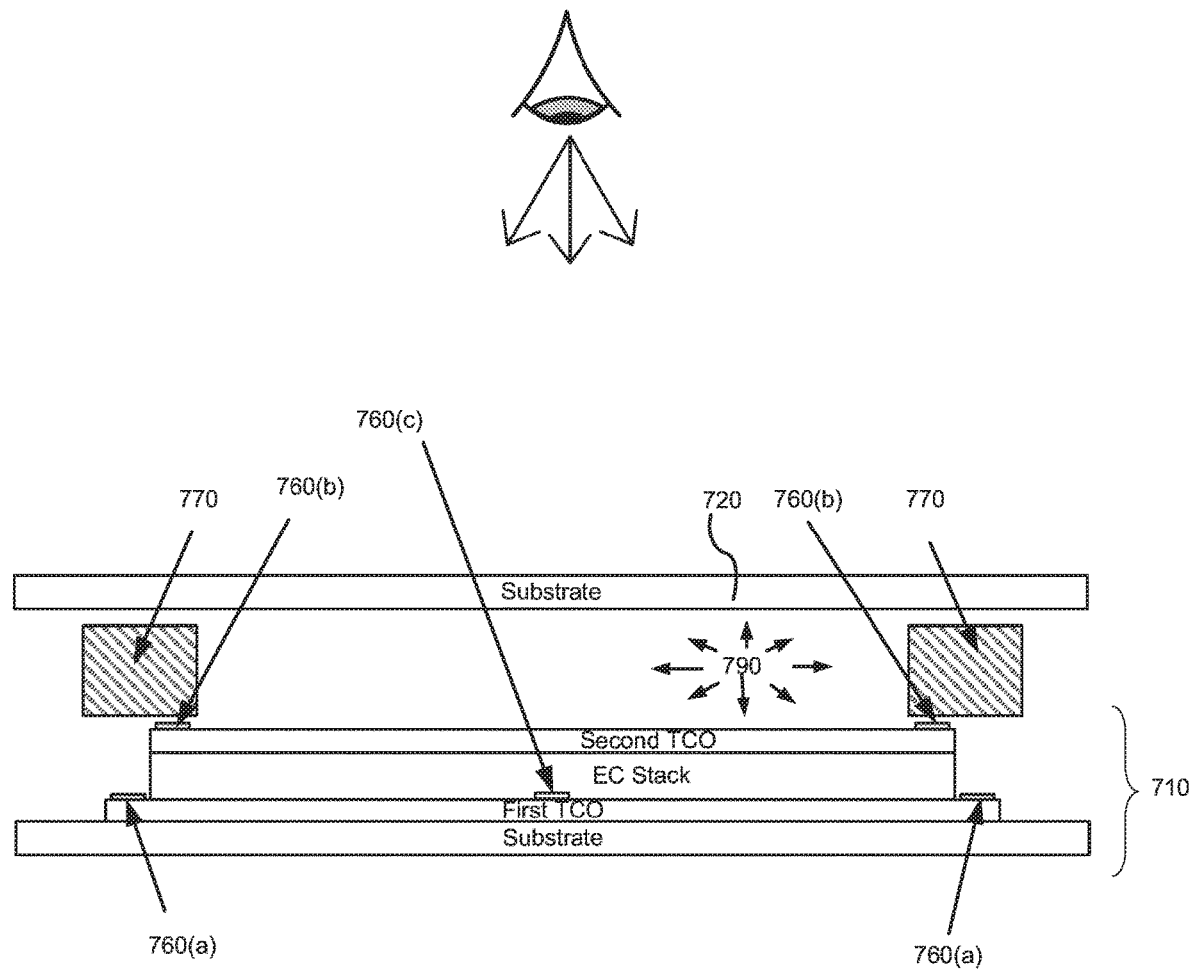
FIG. 5C is a drawing of a cross-sectional view of an EC IGU comprising an optically unobtrusive bus bar within a viewable region, according to an embodiment.
Figure 5D:
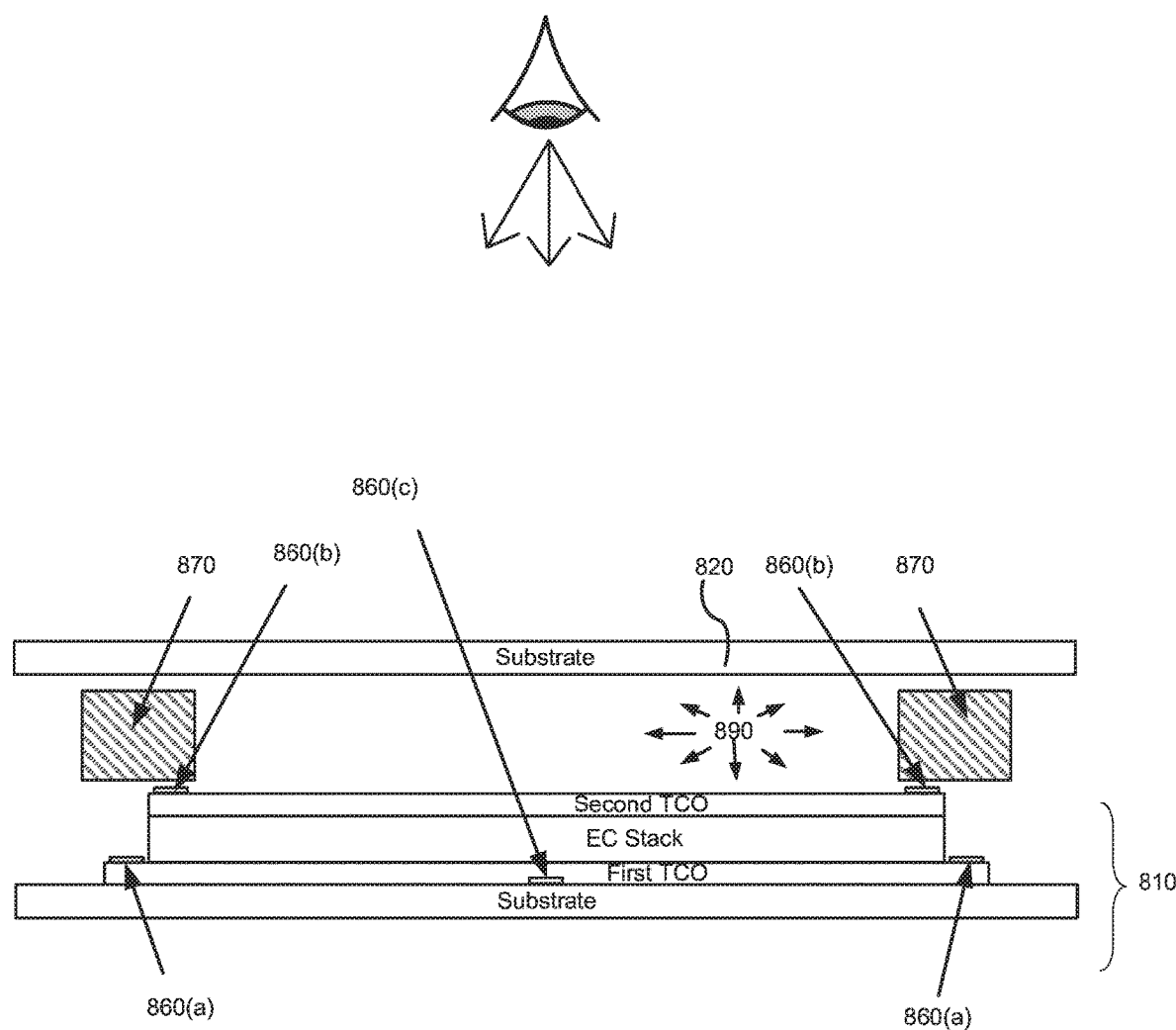
FIG. 5D is a drawing of a cross-sectional view of an EC IGU comprising an optically unobtrusive bus bar within a viewable region, according to an embodiment.
Figure 6A:
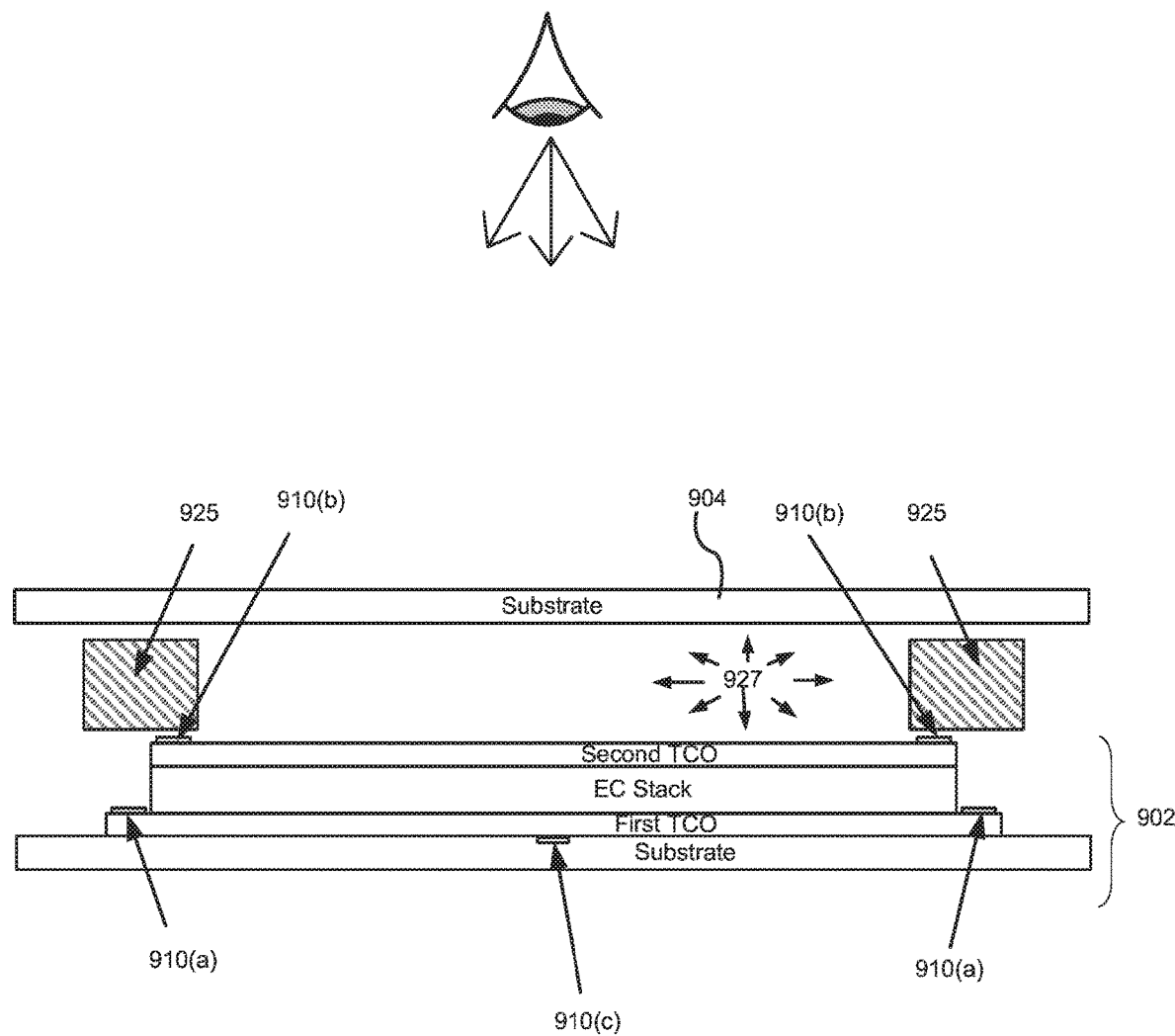
FIG. 6A is a drawing of a cross-sectional view of an EC IGU comprising an optically unobtrusive bus bar) within a viewable region, according to an embodiment.
Figure 6B:
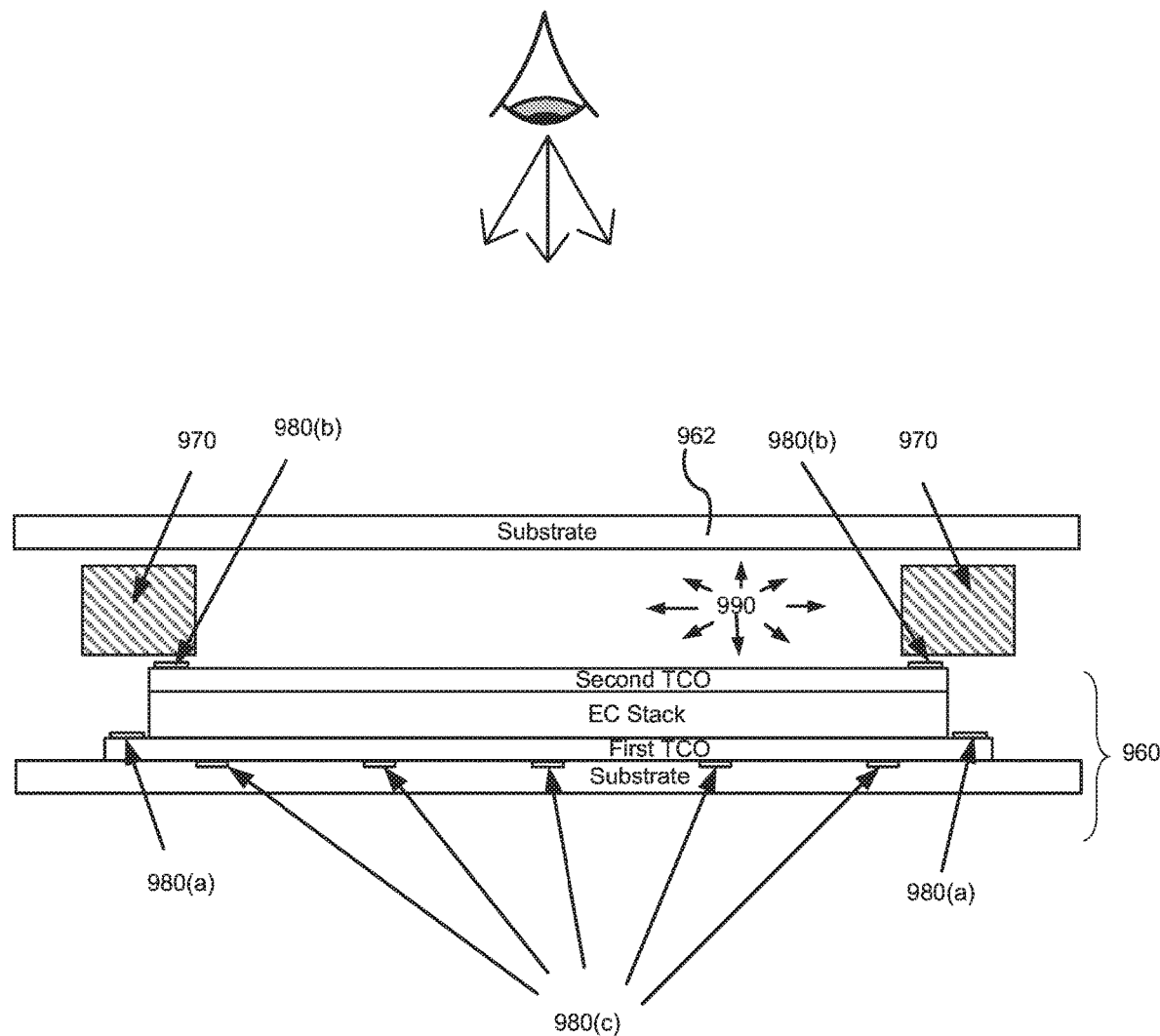
FIG. 6B is a drawing of a cross-sectional view of an EC IGU comprising an optically unobtrusive bus bar within a viewable region, according to an embodiment

In certain embodiments, the optically unobtrusive bus bars may be fabricated onto the surface (e.g., bus bar 860(*c*) shown in FIG. 5D) of a substrate or embedded into the substrate (e.g., bus bar 910(*c*) shown in FIG. 6A and bus bar 930(*c*) shown in FIG. 6B) in some cases. For example, the optically unobtrusive bus bars may be fabricated onto the substantially transparent substrate by patterning material such as, for example, by rolling lithography. In another example, the optically unobtrusive bus bars may be embedded into the substrate by first grinding or otherwise fabricating trenches into the substrate, filling the trenches with the bus bar material, and then planarizing the substrate before depositing the EC device layers. In this example, distortion of the EC device layers may be avoided.

FIG. 5A is a drawing of a cross-sectional view of an EC IGU, 500, comprising an optically unobtrusive bus bar 560(*c*) within a viewable region, according to an embodiment. FIG. 5A also includes an observer viewing the IGU (as depicted with the stylized eye) from, for example, the inside of a building. This is a not-to-scale, partially exploded view showing certain components of the fabricated assembly of the IGU 500 separated. In FIG. 5A, a spacer, 570, is used to separate an EC pane (lite), 510, from a non-EC pane 520. The first EC pane 510 comprises a first TCO, an EC stack, and second TCO, fabricated on a first substantially transparent substrate, such as a glass substrate. The second pane 520 is a non-EC pane that is a substantially transparent substrate. In other examples, the second pane 520 can have an EC device thereon and/or one or more coatings such as low-E coatings and the like. Although not shown, between spacer 570 and, in this example, the first substrate of first EC pane is a primary seal. This primary seal is also between spacer 570 and the second non-EC pane 520. Around the outer perimeter of spacer 570, and between the substrates, is fabricated a secondary seal (not shown). These seals aid in keeping moisture out of the interior space, 590, of the IGU 500.

In FIG. 5A, the EC IGU 500 comprises a transparent or substantially transparent or otherwise optically unobtrusive bus bar 560(*c*) fabricated on the second TCO of the first EC pane 510 in the viewable area of the IGU 500 between the spacers 570. The EC IGU 500 further comprises two bus bars 560(*a*) fabricated on the first TCO of the first EC pane 510 and two bus bars 560(*b*) (which are optional) fabricated on the second TCO outside the generally viewable area of the IGU 500. Bus bars 560(*a*) and 560(*b*) are blocked by the spacer 570 from view by an observer from the viewpoint of the stylized eye. In this example, the bus bars 560(*a*) and/or 560(*b*) are made of or coated by a material that blends in optically with the background of the spacer 570 so that an observer from the opposite side (e.g., outside the building) cannot discern the bus bars 560(*a*) and 560(*b*). In other cases, the bus bars 560(*a*) and/or 560(*b*) may be transparent or substantially transparent or otherwise optically unobtrusive. That is, bus bars 560(*a*) would be discernable from the viewpoint of an observer from the opposite side unless bus bars 560(*a*) blend into the background of the spacer 570 or are optically unobtrusive. Also, bus bars 560(*b*) would be discernable from the opposite side if the EC device is in the un-tinted state and may be discernable if the EC device is in the tinted state unless bus bars 560(*a*) blend into the background of the spacer 570 or are optically unobtrusive. Although a single optically unobtrusive bus bar 560(*c*) is shown in the illustrated example, additional bus bars 560(*c*) may be fabricated on the first TCO, the EC stack, the second TCO, and/or onto/into the substrate in other examples. One embodiment, for example, is an EC device coating with multiple bus bars on the second TCO (upper), e.g. EC device 510*b*. The bus bars may be substantially transparent, e.g. made of metal, or other transparent materials described herein. In one embodiment, the EC device has, e.g. two bus bars on the bottom TCO, e.g. configured as depicted in FIG. 5A, that is, under the spacer. In other embodiments the bottom TCO has a bus bar on each side of the bottom TCO, e.g. four bus bars or two L-shaped bus bars. In one embodiment, the top TCO has two L-shaped bus bars, substantially transparent, while the bottom TCO has bus bars configured as described in the previous two sentences.

FIG. 5B is a drawing of a cross-sectional top view of an EC IGU, 600, comprising an optically unobtrusive bus bar 660(*c*) within a viewable region, according to an embodiment. FIG. 5B also includes an observer viewing the IGU from, for example, the inside of a building. This is a not-to-scale, partially exploded view showing certain components of the fabricated assembly of the IGU separated. In FIG. 5B, a spacer, 670, is used to separate an EC pane (lite), 610, from a non-EC pane 620. The first EC pane 610 comprises a first TCO, an EC stack, and second TCO, fabricated on a first substantially transparent substrate, such as a glass substrate. The second pane 620 is a non-EC pane that is a substantially transparent substrate. In other examples, the second pane 620 can have an EC device thereon and/or one or more coatings such as low-E coatings and the like. Although not shown, between spacer 670 and, in this example, the first substrate of first EC pane is a primary seal. This primary seal is also between spacer 670 and the second non-EC pane 620. Around the perimeter of spacer 670 is a secondary seal. These seals aid in keeping moisture out of the interior space, 690, of the IGU 600.

In FIG. 5B, the EC IGU 600 comprises a transparent or substantially transparent or otherwise optically unobtrusive bus bar 660(*c*) fabricated on the EC stack of the first EC pane 610 in the viewable area of the IGU 600 between the spacers 670. The EC IGU 600 further comprises two bus bars 660(*a*) fabricated on the first TCO of the first EC pane 610 and two bus bars 660(*b*) (which are optional) fabricated on the second TCO outside the generally viewable area of the IGU 500. In other cases, the two bus bars 660(*b*) may be fabricated on the EC stack of the first EC pane 610. In the illustrated example, bus bars 660(*a*) and 660(*b*) are blocked by the spacer 670 from view by an observer from the viewpoint of the stylized eye. In this example, the bus bars 660(*a*) and/or 660(*b*) are made of or coated by a material that blends in optically with the background of the spacer 670 so that an observer from the opposite side (e.g., outside the building) cannot discern the bus bars 660(*a*) and 660(*b*). In other cases, the bus bars 660(*a*) and/or 660(*b*) may be transparent or substantially transparent or otherwise optically unobtrusive. That is, bus bars 660(*a*) would be discernable from the viewpoint of an observer from the opposite side unless bus bars 660(*a*) blend into the background of the spacer 670 or are optically unobtrusive. Also, bus bars 660(*b*) would be discernable from the opposite side if the EC device is in the un-tinted state and may be discernable if the EC device is in the tinted state unless bus bars 660(*a*) blend into the background of the spacer 670 or are optically unobtrusive. Although a single optically unobtrusive bus bar 660(*c*) is shown in the illustrated example, additional optically unobtrusive bus bars 660(*c*) may be fabricated on the first TCO, the EC stack, the second TCO, and/or onto/into the substrate in other examples.

FIG. 5C is a drawing of a cross-sectional top view of an EC IGU, 700, comprising an optically unobtrusive bus bar 760(*c*) within a viewable region, according to an embodiment. FIG. 5C also includes an observer viewing the IGU from, for example, the inside of a building. This is a not-to-scale, partially exploded view showing certain components of the fabricated assembly of the IGU separated. In FIG. 5C, a spacer, 770, is used to separate an EC pane (lite), 710, from a non-EC pane 720. The first EC pane 710 comprises a first TCO, an EC stack, and second TCO, fabricated on a first substantially transparent substrate, such as a glass substrate. The second pane 720 is a non-EC pane that is a substantially transparent substrate. In other examples, the second pane 720 can have an EC device thereon and/or one or more coatings such as low-E coatings and the like. Although not shown, between spacer 770 and, in this example, the first substrate of first EC pane is a primary seal. This primary seal is also between spacer 770 and the second non-EC pane 720. Around the perimeter of spacer 770 is a secondary seal. These seals aid in keeping moisture out of the interior space, 790, of the IGU 700.

In FIG. 5C, the EC IGU 700 comprises a transparent or substantially transparent or otherwise optically unobtrusive bus bar 760(*c*) fabricated on the first TCO of the first EC pane 710 in the viewable area of the IGU 700 between the spacers 770. The EC IGU 700 further comprises two bus bars 760(*a*) fabricated on the first TCO of the first EC pane 710 and two bus bars 760(*b*) fabricated on the second TCO outside the generally viewable area of the IGU 700. In the illustrated example, bus bars 760(*a*) and 760(*b*) are blocked by the spacer 770 from view by an observer from the viewpoint of the stylized eye. In this example, the bus bars 760(*a*) and/or 760(*b*) are made of or coated by a material that blends in optically with the background of the spacer 770 so that an observer from the opposite side (e.g., outside the building) cannot discern the bus bars 760(*a*) and 760(*b*). In other cases, the bus bars 760(*a*) and/or 760(*b*) may be transparent or substantially transparent or otherwise optically unobtrusive. That is, bus bars 760(*a*) would be discernable from the viewpoint of an observer from the opposite side unless bus bars 760(*a*) blend into the background of the spacer 770 or are optically unobtrusive. Also, bus bars 760(*b*) would be discernable from the opposite side if the EC device is in the un-tinted state and may be discernable if the EC device is in the tinted state unless bus bars 760(*a*) blend into the background of the spacer 770 or are optically unobtrusive. Although a single optically unobtrusive bus bar 760(*c*) is shown in the illustrated example, additional bus bars 760(*c*) may be fabricated on the first TCO, the EC stack, the second TCO, and/or onto/into the substrate in other examples.

FIG. 5D is a drawing of a cross-sectional top view of an EC IGU, 800, comprising an optically unobtrusive bus bar 860(*c*) within a viewable region, according to an embodiment. FIG. 5D also includes an observer viewing the IGU from, for example, the inside of a building. This is a not-to-scale, partially exploded view showing certain components of the fabricated assembly of the IGU separated. In FIG. 5D, a spacer, 870, is used to separate an EC pane (lite), 810, from a non-EC pane 820. The first EC pane 810 comprises a first TCO, an EC stack, and second TCO, fabricated on a first substantially transparent substrate, such as a glass substrate. The second pane 820 is a non-EC pane that is a substantially transparent substrate. In other examples, the second pane 820 can have an EC device thereon and/or one or more coatings such as low-E coatings and the like. Although not shown, between spacer 870 and, in this example, the first substrate of first EC pane is a primary seal. This primary seal is also between spacer 870 and the second non-EC pane 820. Around the perimeter of spacer 870 is a secondary seal. These seals aid in keeping moisture out of the interior space, 890, of the IGU 800.

In FIG. 5D, the EC IGU 800 comprises a transparent or substantially transparent or otherwise optically unobtrusive bus bar 860(*c*) fabricated on the surface of the substrate of the first EC pane 810 in the viewable area of the IGU 800 between the spacers 870. For example, the transparent or otherwise optically unobtrusive bus bar 860(c) may be patterned on the substrate with, for example, rolling lithography. The EC IGU 800 further comprises two bus bars 860(a) fabricated on the first TCO of the first EC pane 810 and two bus bars 860(b) fabricated on the second TCO outside the generally viewable area of the IGU 800. In other cases, the two bus bars 860(b) may be fabricated on the substrate of the first EC pane 810. In the illustrated example, bus bars 860(a) and 860(b) are blocked by the spacer 870 from view by an observer from the viewpoint of the stylized eye. In this example, the bus bars 860(a) and/or 860(b) are made of or coated by a material that blends in optically with the background of the spacer 870 so that an observer from the opposite side (e.g., outside the building) cannot discern the bus bars 860(a) and 860(b). In other cases, the bus bars 860(a) and/or 860(b) may be optically unobtrusive. That is, bus bars 860(a) would be discernable from the viewpoint of an observer from the opposite side unless bus bars 860(a) blend into the background of the spacer 870 or are optically unobtrusive. Also, bus bars 860(b) would be discernable from the opposite side if the EC device is in the un-tinted state and may be discernable if the EC device is in the tinted state unless bus bars 860(a) blend into the background of the spacer 870 or are optically unobtrusive. Although a single optically unobtrusive bus bar 860(c) is shown in the illustrated example, additional bus bars 860(c) may be fabricated on the first TCO, the EC stack, the second TCO, and/or onto/into the substrate in other examples.

In some cases such as the illustrated examples shown in FIGS. 6A and 6B, one or more transparent or substantially transparent or otherwise optically unobtrusive bus bars may be embedded in the substrate of an EC pane in the viewable area of an EC window. For example, the optically unobtrusive bus bars may be embedded into the substrate by first grinding or otherwise fabricating trenches into the substrate, filling the trenches with the bus bar material, and then planarizing the substrate before depositing the EC device layers. FIG. 6A illustrates an example with a single optically unobtrusive bus bar embedded in the substrate of an EC pane. FIG. 6B illustrates an example with multiple optically unobtrusive bus bars embedded in the substrate of an EC pane.

FIG. 6A is a drawing of a cross-sectional top view of an EC IGU, 900, comprising an optically unobtrusive bus bar 910(c) within a viewable region, according to an embodiment. FIG. 6A also includes an observer viewing the IGU from, for example, the inside of a building. This is a not-to-scale, partially exploded view showing certain components of the fabricated assembly of the IGU separated. In FIG. 6A, a spacer, 925, is used to separate an EC pane (lite), 902, from a non-EC pane 904. The first EC pane 902 comprises a first TCO, an EC stack, and second TCO, fabricated on a first substantially transparent substrate, such as a glass substrate. The second pane 904 is a non-EC pane that is a substantially transparent substrate. In other examples, the second pane 904 can have an EC device thereon and/or one or more coatings such as low-E coatings and the like. Although not shown, a primary seal may lie between the spacer 925 and the substrate of the first EC pane 902 and also between the spacer 925 and the second non-EC pane 904. Although not shown, a second seal lies around the perimeter of the spacer 925. These seals aid in keeping moisture out of the interior space, 927, of the IGU 900.

In FIG. 6A, the EC IGU 900 comprises a transparent or substantially transparent or otherwise optically unobtrusive bus bar 910(c) embedded in the substrate of the first EC pane 902 in the viewable area of the IGU 900 between the spacers 925. In this example, distortion of the EC device layers may be avoided. The EC IGU 900 further comprises two bus bars 910(a) fabricated on the first TCO of the first EC pane 902 and two bus bars 910(b) fabricated on the second TCO outside the generally viewable area of the IGU 800. In other cases, the two bus bars 910(b) may also be embedded in the substrate of the first EC pane 902. In the illustrated example, bus bars 910(a) and 910(b) are blocked by the spacer 925 from view by an observer from the viewpoint of the stylized eye. In the illustrated example, the bus bars 910(a) and/or 910(b) are made of or coated by a material that blends in optically with the background of the spacer 870 so that an observer from the opposite side (e.g., outside the building) cannot discern the bus bars 910(a) and 910(b). In other cases, the bus bars 910(a) and/or 910(b) may be optically unobtrusive. That is, bus bars 910(a) would be discernable from the viewpoint of an observer from the opposite side unless bus bars 910(a) blend into the background of the spacer 870 or are optically unobtrusive. Also, bus bars 910(b) would be discernable from the opposite side if the EC device is in the un-tinted state and may be discernable if the EC device is in the tinted state unless bus bars 910(a) blend into the background of the spacer 870 or are optically unobtrusive.

FIG. 6B is a drawing of a cross-sectional top view of an EC IGU, 950, comprising an optically unobtrusive bus bar 980(c) within a viewable region, according to an embodiment. FIG. 6B also includes an observer viewing the IGU 950 from, for example, the inside of a building. This is a not-to-scale, partially exploded view showing certain components of the fabricated assembly of the IGU separated. In FIG. 6B, a spacer, 970, is used to separate an EC pane (lite), 960, from a non-EC pane 962. The first EC pane 960 comprises a first TCO, an EC stack, and second TCO, fabricated on a first substantially transparent substrate, such as a glass substrate. The second pane 962 is a non-EC pane that is a substantially transparent substrate. In other examples, the second pane 962 can have an EC device thereon and/or one or more coatings such as low-E coatings and the like. Although not shown, a primary seal may lie between the spacer 970 and the substrate of the first EC pane 960 and also between the spacer 970 and the second non-EC pane 962. Although not shown, a second seal lies around the perimeter of the spacer 970. These seals aid in keeping moisture out of the interior space, 990, of the IGU 950.

In FIG. 6B, the EC IGU 950 comprises five (5) optically unobtrusive bus bar 980(c) embedded in the substrate of the first EC pane 902 in the viewable area of the IGU 950 between the spacers 970. Although five (5) optically unobtrusive bus bars 980(c) are shown in the illustrated example, other numbers may be used. The EC IGU 950 further comprises two bus bars 980(a) fabricated on the first TCO of the first EC pane 960 and two bus bars 980(b) fabricated on the second TCO outside the generally viewable area of the IGU 950. In other cases, the two bus bars 980(b) may also be embedded in the substrate of the first EC pane 960. In the illustrated example, bus bars 980(a) and 980(b) are blocked by the spacer 970 from view by an observer from the viewpoint of the stylized eye. In the illustrated example, the bus bars 980(a) and/or 980(b) are made of or coated by a material that blends in optically with the background of the spacer 970 so that an observer from the opposite side (e.g., outside the building) cannot discern the bus bars 980(a) and 980(b). In other cases, the bus bars 980(a) and/or 980(b) may be transparent or substantially transparent or otherwise optically unobtrusive. That is, bus bars 980(a) would be discernable from the viewpoint of an observer from the opposite side unless bus bars 980(*a*) blend into the background of the spacer 970 or are optically unobtrusive. Also, bus bars 980(*b*) would be discernable from the opposite side if the EC device is in the un-tinted state and may be discernable if the EC device is in the tinted state unless bus bars 980(*a*) blend into the background of the spacer 970 or are optically unobtrusive.

In one embodiment, an EC device has multiple transparent bus bars embedded in the substrate and also multiple transparent bus bars on the top TCO, as depicted in FIG. 5A (bottom). This configuration allows more even and faster tinting of the EC device stack. The bus bars on the top and bottom of the device structure may be parallel or not. Advantages to having non-parallel bus bars, e.g., is wiring of the bus bar ends for each TCO can be done on orthogonal sides. The number of transparent bus bars on the top and or bottom of the EC device as described herein can be one, two, three, four, five or more; depending on the size of the substrate the conductivity of the bus bar material used, the conductivity of the TCO to which the bus bars are electrically communicating with, switching speed desired, etc.

D. Matching Resistive Properties of Conductor Layers Using Bus Bars.

Typically conductor layers in an EC device are designed to match resistively to each other. In some cases, these conductor layers may not match, for example, the top and bottom TCOs may have substantially different electrical conductivity. For example the bottom TCO may have a low resistivity, e.g. <5 ohms/sq, while the top TCO might have a resistivity of greater than 10 ohms/sq. In these cases, the material of the bus bar may be selected to compensate for the resistive properties and to match the resistive properties of the conductive layers. For example, as depicted in the bottom portion of FIG. 5A, a series of transparent bus bars may be fabricated on the top TCO to compensate for this resistivity difference, i.e. allow more voltage to be applied across the top TCO and therefore compensate for its lower resistivity than the bottom TCO. In fact, this is one desirable construct; i.e. where a top TCO is purposefully fabricated with a higher resistivity than the bottom TCO, in anticipation of further fabricating multiple transparent bus bars thereon (so as not to have a final device structure that would otherwise have a resistivity mismatch where the top TCO has a net lower resistivity than the bottom TCO due to added conducting bus bars on the top TCO).

F. Bus Bars Residing Under the Spacer

Some conventional IGUs have a bus bar on the inner surface of an EC lite that traverses the primary seal (between the spacer and the EC pane). That is, this bus bar is located on this inner surface running primarily within the inner perimeter of the spacer and exits through the primary seal under the spacer to connect to a power line outside the outer perimeter of the spacer. In these IGUs, the EC coating does not lie outside the inner perimeter of the spacer i.e. under the spacer. Typically, these conventional IGUs also have scribe lines in the EC coating within this inner perimeter of the spacer.

Traversing the primary seal with the bus bar can create a possible leak path through the seal along a weak seal between the bus bar and the primary seal. Some conventional systems use a coating applied over the bus bar to keep the IGU sealed from leaking gas from the sealed space within the IGU. These conventional IGUs use blocking material to prevent viewers from seeing the bus bars from both sides of the IGU from within the inner perimeter of the spacer. These IGUs use a laminated outer lite to sandwich the blocking material between a support substrate and an inner substrate having the EC device on the opposite surface from the blocking material. This block material in the laminated lite must also block the scribe lines from viewers as well. From one side of the IGU, a blocking layer is used to prevent view of the bus bars and scribe lines. From the other side, material is applied over the bus bar to blend in with the background material in the laminated lite. This blocking material takes up valuable area within the inner perimeter of the spacer that would otherwise be viewable area. Embodiments described herein differ in that they do not occupy viewable area by design (if they do it is de minimus).

In certain aspects, bus bars of EC glass structures described herein reside almost entirely under the spacer. In these cases, the bus bar does not pass through the inner diameter and avoids creating a leak path in the seal that could potentially allow gas within the sealed volume of the IGU to leak out. Since these bus bars reside under the spacer (e.g., embedded in the seal or the EC coating), the spacer itself blocks the bus bars from being viewed from one side. In this case, only a single direction of view of the bus bars from the other side must be obscured. In this direction, the bus bars have the primary seal of the spacer in the background. Since only the view outside of the inner perimeter of the spacer needs to be blocked from view, much of the area within the inner perimeter of the spacer is available as viewable area.

In certain aspects, an obscuration layer is located at the same interface as the EC coating, where the interface is between an inner IGU substrate and the spacer. The obscuration layer is only required to block the view of the bus bar from the single direction since it lies under the spacer and cannot be seen through the opposite side through the spacer.

In certain aspects, the obscuration layer does not reside within the inner perimeter of the spacer. The obscuration layer is only blocking from view the embedded bus bar with the spacer in the background. As discussed above, the bus bar does not reside within the inner perimeter of the spacer and thus, there would be no reason to place an obscuration layer within the inner perimeter. Furthermore, the obscuration layer the obscuration layer need only be the width of the bus bar or about the width of the bus bar to block the view of the bus bar. For example, ink or other materials may be applied to an area that does not exceed the spacer's inner perimeter.

Figure 7:
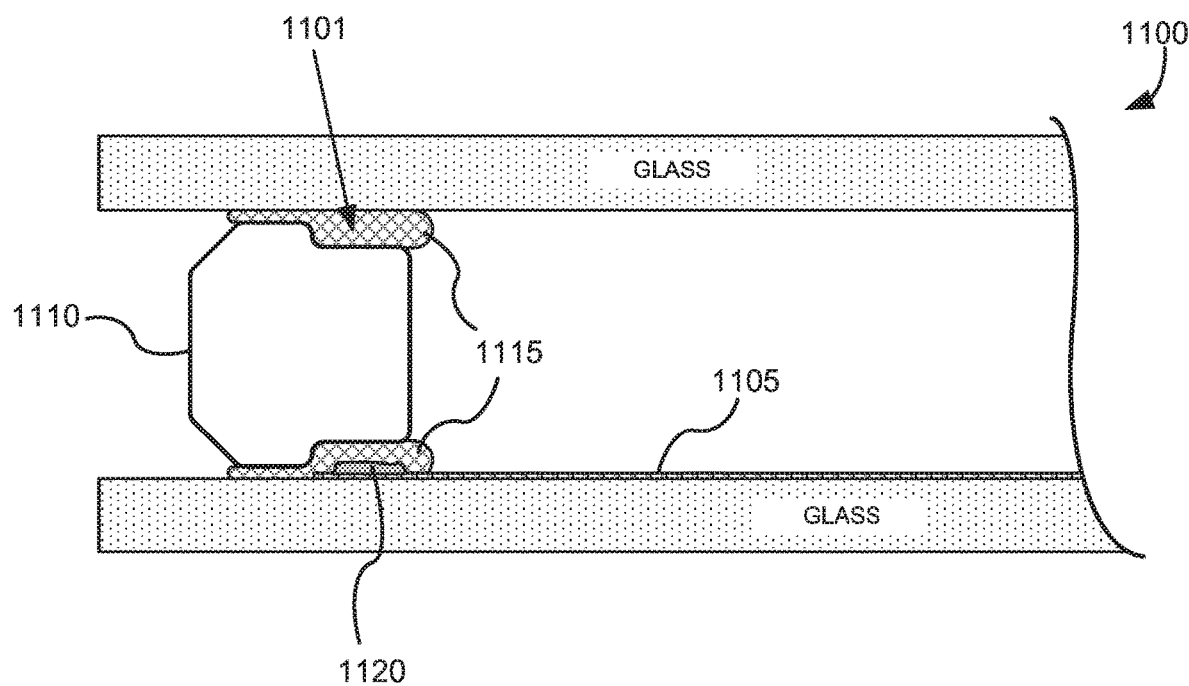
FIG. 7 is a drawing of a cross section of an edge region of an IGU comprising a spacer residing under a spacer, according to an embodiment.

Examples of bus bars residing under spacers can be found in U.S. patent application Ser. No. 14/152,873 titled "SPACERS FRO INSULATED GLASS UNITS," and filed on Jul. 10, 2014, which is hereby incorporated by reference in its entirety. FIG. 7 shows an example of a cross section, 1100, of an edge region of an IGU where the spacer 1110 of the IGU and a bus bar 1120 reside. In the illustration, the bus bar 1120 resides under the spacer 1110. As illustrated, a spacer, 1110, is sandwiched between two sheets of glass near the edge of the IGU. In a typical design, the glass interfaces directly with a primary seal material, 1115, (e.g., a thin elastomeric layer, such as PIB or PVB), which is in direct contact with spacer 1110. In some embodiments, spacer 1110 may be metal spacer, such as a steel spacer or a stainless steel spacer, for example. This three-part interface (i.e., glass/primary seal material/spacer) exists on both a top piece of glass and a bottom piece of glass. Spacer 1110 may have a hollow structure, as depicted in FIG. 7. In some embodiments, the spacer may have a substantially rectangular cross section. At a minimum, spacers described herein have at least two surfaces, each substantially parallel to the lites of the IGU in which they are to be incorporated. The remaining cross section, e.g., surfaces of the spacer that face the interior space of the IGU and the exterior, secondary seal area, space may have any number of contours, i.e., they need not be flat, but may be. In some embodiments, the top and bottom outer corners of the spacer are beveled and/or rounded to produce a shallower angle in these areas. Rounding, beveling, or smoothing may be included to ensure there are no sharp edges that might enhance electrical shorting. An electrochromic device stack, 1105, is fabricated on the lower glass lite, as depicted. A bus bar, 1120, is located on electrochromic device stack 1105 in order to make electrical contact with one of the electrodes of the device. In this example, bus bar 1120 is between spacer 1110 and the lower glass lite. This is accomplished by configuring one of the aforementioned surfaces below (see top surface of spacer 1110) or above (see bottom surface of spacer 1110) the other surface on the face of the spacer that forms the primary seal with the glass surface. This configuration of surfaces forms "notch" 1101; see further description below. Primary seal material 1115 serves as an insulating layer between bus bar 1120 and spacer 1110. Spacer embodiments with notches may help to accommodate added vertical thickness, e.g. due to obscuration layers.

There are two primary distinctions between a typical spacer design and spacer 1110 shown in FIG. 7. First, spacer 1110 is relatively thicker (wider) in the direction parallel to the glass sheet (i.e., a larger footprint). A conventional metal spacer is approximately 6 millimeters in width. Spacer 1110 is about two times to about two and one half times (about 2× to about 2.5×) that width. For example, spacer 1110 may be about 10 millimeters to about 15 millimeters wide, about 13 millimeters to about 17 millimeters wide, or about 11 millimeters wide. This additional width may provide a greater margin of error in a sealing operation compared to a conventional spacer.

The second significant distinction of spacer 1110 from a conventional spacer is in the use of recesses or notches 1101 on the upper and lower inner corners of spacer 1110. In some embodiments, a spacer may include two notches, and in some embodiments, the spacer may include one notch. Two notches, e.g., as depicted in FIG. 7, may be used for an IGU containing two electrochromic lites, or may be useful in fabricating IGUs with only one electrochromic light. When using a spacer with two notches in an IGU containing one electrochromic lite, there is no need for special placement of a single notch toward the electrochromic lite. In some embodiments, a recess or notch may extend from a corner of one side of the rectangular cross section of the spacer to a point along the one side of the rectangular cross section of the spacer. At least one notch provides an area for covering the bus bar formed on the glass surface and/or covering the bus bar formed on electrochromic device stack 505 formed on the substrate surface. In some embodiments, the bus bar is about 2 millimeters to about 3 millimeters in width and about 0.01 millimeters to about 0.1 millimeter in height (thickness). The bus bar length depends on the window size. In some embodiments, a bus bar may have a length about the length of the electrochromic device. The added width, along with the "notched" profile of spacer 1110 that accommodates the bus bar, creates a region of "encapsulation" whereby the bus bar is unlikely to contact the spacer at any point along the length of the bus bar, but is encapsulated in the primary sealant.

In some embodiments, the portion of the spacer's face that does not include the notch (i.e., the outer portion of the spacer) is approximately the same width as a normal spacer employed in non-electrochromic IGU applications. As depicted in FIG. 7, bus bar 1120 is entirely covered by the spacer 1110. As a consequence, the bus bar is not visible to a user of the window.

In FIG. 7, electrochromic device stack 1105 extends underneath bus bar 1120 and partially into the region formed by notch 1101 in spacer 1110. As noted above, an electrochromic device stack typically includes a conductive electrode layer such as ITO or TEC. Electrochromic device stack 1105 may be entirely removed from the edge of the glass surface by an edge deletion process, described above. However, the removal by edge deletion may not extend entirely up to the edge of the bus bar, as this would be unacceptable given normal process tolerances. Therefore, electrochromic device stack 1105 may extend just slightly beyond bus bar 1120, e.g., while still residing in notch 1101.

Figure 8:
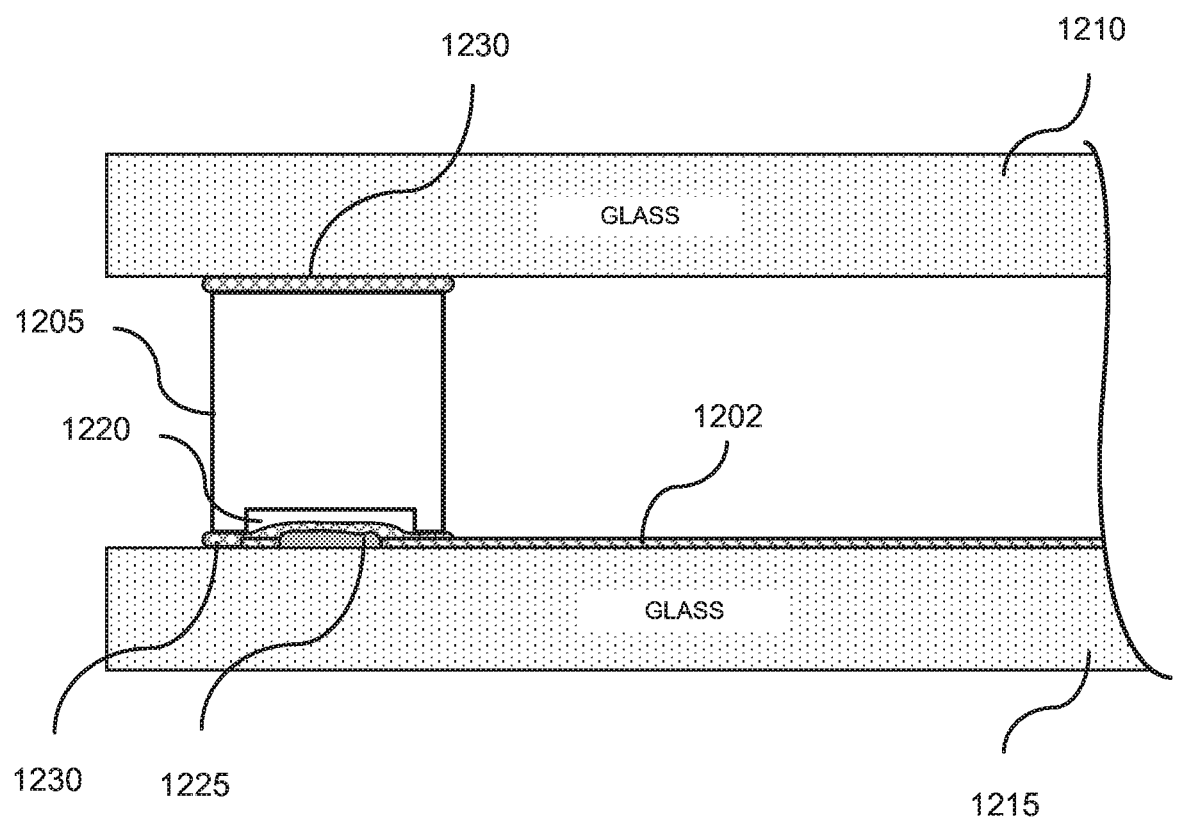
FIG. 8 is a drawing of a cross-sectional of a spacer which has a notch on the bottom to accommodate the full length of a bus bar, according to an embodiment.

FIG. 8 shows an example of a cross-sectional illustration of a spacer which has a notch on the bottom to accommodate the full length of an embedded bus bar. As shown in FIG. 8, a spacer, 1205, is between two glass lites, 1210 and 1215. In some embodiments, spacer 1205 may be a metal spacer, such as a steel spacer or a stainless steel spacer, for example. In some embodiments, spacer 1205 may have a substantially rectangular cross section. In some embodiments, spacer 1205 may be hollow. Spacer 1205 includes a notch or recess, 1220, to accommodate a bus bar, 1225. Notch or recess 1220 may form a channel that accommodates the length of bus bar 1225. Notch 1220 should be distinguished from a channel or a "mouse hole" in the spacer which may accommodate a bus bar lead. An electrochromic device stack, 1202, is fabricated on glass lite 815. Bus bar 1225 located on electrochromic device stack 1202 makes electrical contact with one of the electrodes of electrochromic device stack 1202.

Notch 1220 in spacer 1205 resides in the middle of the underside of spacer 1205. The dimensions of notch 1220 are suitable to accommodate bus bar 1225, factoring in tolerances of the process used to form the notch, as discussed above. In some embodiments, the notch width is about 2 millimeters to about 5 millimeters, and the notch height is about 0.1 millimeters to 1 millimeter. In some embodiments, the notch width is about 3 millimeters to 4 millimeters, and the notch height is about 0.1 millimeter to about 0.5 millimeters.

Comparing notch 1220 shown in FIG. 8 to notch 1101 shown in FIG. 7, notch 1220 is in the middle of the underside of the spacer and notch 1101 is at the interior edge of the underside of the spacer. In other regards, however, the embodiment shown in FIG. 8 may be similar to the embodiment shown in FIG. 7. For example, many of the dimensions and other design features described with respect to FIG. 7 may apply equally to FIG. 8. Spacer 1205 may be relatively wider in the direction parallel to the glass sheet compared to conventional metal spacers. A conventional metal spacer is approximately 6 millimeters in width. Spacer 1205 is about two times to about two and one half times (about 2× to about 2.5×) that width. For example, spacer 1205 may be about 10 millimeters to about 15 millimeters, about 13 millimeters to about 17 millimeters, or about 11 millimeters wide. This additional width may provide a greater margin of error in a sealing operation compared to a conventional spacer. In some embodiments, the bus bar is about 2 millimeters to about 3 millimeters in width and about 0.01 millimeters to about 0.1 millimeter in height (thickness). The bus bar length depends on the window size. In some embodiments, a bus bar may have a length about the length of the electrochromic device. The basic IGU primary seal is comprised of interfaces between glass lites 1210 and 1215 and primary seal material (e.g., PIB), 1230, and between primary seal material 1230 and spacer 1205.

In some embodiments, the channel for the bus bar lead is located, but need only penetrate part way under the spacer because the bus bar resides midway underneath the spacer. In some embodiments, the bus bar lead channel resides on an outside edge of the spacer or on an outside edge of a corner of the spacer.

In some embodiments, the electrochromic device stack 1202 when in a colored state may color all the way under the spacer such that electrochromic device stack 1202 is substantially uniformly colored. Further, the bus bar may not be visible.

g. Combining Obscuring Techniques

In certain embodiments, a combination of the above-described obscuring techniques may be employed in a single EC glass structure. In the illustrated example shown in FIG. 1A for example, bus bar 1 160(*a*) may be an optically unobtrusive bus bar and an obscuring layer may be used under bus bar 2 160(*b*). In this example, both bus bars will not be visible in the untinted state since bus bar 1 is transparent and bus bar 2 is blocked from view by the obscuring layer. In the tinted state, bus bar 2 will continue to be blocked from view.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An electrochromic glass structure, comprising:
   a substantially transparent substrate;
   an electrochromic device coating disposed on the substantially transparent substrate, the electrochromic device coating having one or more transparent conductive layers;
   a bus bar configured to power the electrochromic device; and
   a strip of obscuration material aligned substantially parallel to a length of the bus bar, the strip of obscuration material located on a surface of the electrochromic glass structure between the bus bar and an exterior environment to the electrochromic glass structure;
   wherein the strip of obscuration material has an open cell pattern or is configured as a discontinuous pattern of shapes rather than a continuous strip of material.

2. The electrochromic glass structure of claim 1, wherein the strip of obscuration material has at least a width configured to block view of the bus bar from an observer viewing through the substantially transparent substrate.

3. The electrochromic glass structure of claim 2, wherein the strip of obscuration material has a width that is greater than a width of the bus bar.

4. The electrochromic glass structure of claim 1, wherein the strip of obscuration material is on an outer surface of the substantially transparent substrate.

5. The electrochromic glass structure of claim 4, wherein the strip of obscuration material is a thin flexible material adhered to the outer surface of the substantially transparent substrate with an adhesive.

6. The electrochromic glass structure of claim 5, wherein the thin flexible material is anodized aluminum.

7. The electrochromic glass structure of claim 1, wherein the strip of obscuration material is located in a region between the bus bar and the substantially transparent substrate.

8. The electrochromic glass structure of claim 1, wherein the strip of obscuration material is located between an outer surface of the substantially transparent substrate and a surface of another substantially transparent substrate that is laminated to the outer surface of the substantially transparent substrate.

9. The electrochromic glass structure of claim 1 or 6, wherein the strip of obscuration material is a thermochromic coating and/or photochromic coating.

10. The electrochromic glass structure of claim 1, wherein the strip of obscuration material is opaque.

11. The electrochromic glass structure of claim 1, wherein the strip of obscuration material comprises one or more of a paint, a polymeric coating, a tape, a metal strip, a foil, and a shim stock.

12. The electrochromic glass structure of claim 1, wherein the strip of obscuration material is adhered using an adhesive.

13. The electrochromic glass structure of claim 1, wherein the strip of obscuration material is adhered using a silicone sealant.

14. The electrochromic glass structure of claim 1, wherein the strip of obscuration material is a frit on a surface of the substantially transparent substrate.

15. The electrochromic glass structure of claim 1, wherein the strip of obscuration material is in a liquid form or a gel form.

16. The electrochromic glass structure of claim 1, wherein the strip of obscuration material is applied by one of screen printing, spraying, and ink jet printing.

17. The electrochromic glass structure of claim 1, wherein the strip of obscuration material is laminated between the substantially transparent substrate and another substrate.

18. The electrochromic glass structure of claim 17, wherein the strip of obscuration material is in or part of a lamination adhesive.

19. The electrochromic glass structure of claim 17, wherein the strip of obscuration material is on a surface of the other substrate.

20. An insulated glass unit (IGU) comprising:
    first and second substantially transparent substrates;
    a spacer between the first and second substantially transparent substrates;
    a primary seal between the spacer and the first substantially transparent substrate and between the spacer and the second substantially transparent substrate;
    an electrochromic device on at least one of the first and second substantially transparent substrates; and
    a bus bar associated with the electrochromic device and located under the spacer and in the primary seal, wherein the bus bar is configured to be camouflaged to blend in with its background, wherein the bus bar comprises a thermochromic material and/or a photochromic material.

21. The IGU of claim 20, wherein the bus bar is configured to have minimal optical contrast with the primary seal and/or the spacer of the IGU.

22. The IGU of claim 21, wherein the bus bar is made of an electrically conductive material comprising a tinting agent configured to approximate a color of the background to the primary seal and/or the spacer of the IGU.

23. The IGU of claim 22, wherein the tinting agent comprises carbon black, graphite and/or graphene.

24. The IGU of claim 20, wherein the bus bar has a narrow profile with a width of about 0.1 mm.

25. An insulated glass unit, comprising:
first and second substantially transparent substrates;
a spacer between the first and second substantially transparent substrates;
a primary seal between the spacer and the first substantially transparent substrate and between the spacer and the second substantially transparent substrate;
an electrochromic device on at least one of the first and second substantially transparent substrates; and
a bus bar associated with the electrochromic device and located under the spacer and in the primary seal, wherein the bus bar is configured to be camouflaged to blend in with its background, and wherein the bus bar has a narrow profile with a width of about 0.1 mm.

26. The insulated glass unit of claim 25, wherein the bus bar comprises a thin layer of metal or metal alloy.

27. The insulated glass unit of claim 25, wherein the bus bar comprises silver nanowires or conductive carbon nanotubes.

28. The insulated glass unit of claim 25, wherein the bus bar comprises a non-metallic and conductive material.

* * * * *